(12) United States Patent
Dutta

(10) Patent No.: US 11,477,116 B2
(45) Date of Patent: Oct. 18, 2022

(54) LOOP DETECTION IN ETHERNET PACKETS

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

(*) Notice: Subject to any disclaimer, the term of this patent is extended or adjusted under 35 U.S.C. 154(b) by 63 days.

(21) Appl. No.: 16/998,396

(22) Filed: Aug. 20, 2020

(65) Prior Publication Data
US 2022/0060415 A1 Feb. 24, 2022

(51) Int. Cl.
*H04W 56/00* (2009.01)
*H04L 45/00* (2022.01)
*H04L 41/12* (2022.01)
*H04L 45/586* (2022.01)
*H04L 101/622* (2022.01)

(52) U.S. Cl.
CPC .......... *H04L 45/66* (2013.01); *H04L 41/12* (2013.01); *H04L 45/22* (2013.01); *H04L 45/586* (2013.01); *H04L 2101/622* (2022.05)

(58) Field of Classification Search
CPC ......... H04L 45/66; H04L 41/12; H04L 45/22; H04L 45/586; H04L 61/6022
USPC ........................................................ 370/392
See application file for complete search history.

(56) References Cited

U.S. PATENT DOCUMENTS

| 7,558,205 B1* | 7/2009 | Moncada-Elias ............................ H04L 12/4625 370/236 |
| 2005/0076140 A1* | 4/2005 | Fung ..................... H04L 49/555 709/245 |
| 2005/0099949 A1* | 5/2005 | Mohan .................... H04L 47/10 370/236.2 |

(Continued)

FOREIGN PATENT DOCUMENTS

WO   WO 2019/239190 A1   12/2019

OTHER PUBLICATIONS

Atlas, Alia., et al., "Basic Specification for IP Fast Reroute: Loop-Free Alternates", Network Working Group, Request for Comments: 5286, Sep. 2008, 31 pages.

(Continued)

*Primary Examiner* — Sai Ming Chan
(74) *Attorney, Agent, or Firm* — Tong, Rea, Bentley & Kim, LLC

(57) ABSTRACT

An ethernet bridge is configured for deployment in a network. The ethernet bridge includes a memory configured to store a first identifier that uniquely identifies the ethernet bridge within the network. The ethernet bridge also includes a transceiver configured to receive a first data link layer packet. The ethernet bridge further includes a processor configured to selectively forward the first data link layer packet based on whether a first recorded route for ethernet (RRE) in the first data link layer packet includes the first identifier. Selectively forwarding the first data link layer packet includes dropping the first data link layer packet in response to the first identifier being in the first data link layer packet or pushing the first identifier onto the first RRE in the first data link layer packet in response to the first identifier not being in the first data link layer packet.

20 Claims, 26 Drawing Sheets

(56) References Cited

U.S. PATENT DOCUMENTS

| | | | |
|---|---|---|---|
| 2005/0188108 A1* | 8/2005 | Carter | H04L 45/28 709/239 |
| 2006/0133286 A1* | 6/2006 | Elie-Dit-Cosaque | H04L 45/00 370/249 |
| 2008/0031154 A1* | 2/2008 | Niazi | H04L 45/02 370/254 |
| 2011/0134924 A1* | 6/2011 | Hewson | H04L 12/4625 370/392 |

OTHER PUBLICATIONS

Eastlake 3rd, Donald, et al., "IANA Considerations and IEIF Protocol and Documentation Usage for IEEE 802 Parameters", Internet Engineering Task Force (IETF), Request for Comments: 7042, Oct. 2013, 27 pages.

Fedyk, Don., et al., "IS-IS Extensions Supporting IEEE 802.1aq Shortest Path Bridging", Internet Engineering Task Force (IETF), Request for Comments: 6329, Apr. 2012, 37 pages.

Eastlake, Donald, et al., "IEEE 802 Numbers", Dec. 23, 2019, 15 pages.

IEEE 802.1, "802.1ad—Provider Bridges", May 26, 2006, www.ieee802.org/1/pages/802.1ad.html, Accessed May 26, 2020, 4 pages.

IEEE 802.1, "802.1ag—Connectivity Fault Management", Dec. 17, 2007, www.ieee802.org/1/pages/802.1ag.html. Accessed May 26, 2020, 5 pages.

IEEE 802.1, "802.1ah—Provider Backbone Bridges", Jun. 12, 2008, www.ieee802.org/1/pages/802.1ah.html, Accessed May 26, 2020, 6 pages.

IEEE 802.1, "802.1aq—Shortest Path Bridging", Mar. 29, 2012, www.ieee802.org/1/pages/802.1aq.html, Accessed May 26, 2020, 6 pages.

IEEE 802.1, "802.1D—MAC bridges", www.ieee802.org/1/pages/802.1D.html, Accessed May 26, 2020, 1 page.

IEEE 802.1, "802.1s—Multiple Spanning Trees", www.ieee802.org/1/pages/802.1s.html, Accessed May 26, 2020, 1 page.

IEEE 802.1, "802.1w—Rapid Reconfiguration of Spanning Tree", www.ieee802.org/1/pages/802.1w.html, Accessed May 26, 2020, 2 pages.

Sajassi, Ali., et al., "BGP MPLS-Based Ethernet VPN", Internet Engineering Task Force (IETF), Request for Comments: 7432, Feb. 2015, 56 pages.

European Search Report mailed in corresponding EP Application No. 21192063.2 dated Jan. 18, 2022, 8 pages.

* cited by examiner

```
                                                              1500
                                                            ↙
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              TPID             | Flags |          Length       |
+-+-+-+-+-+-+-+-+-+-+-+-+-+-+-+-+-+-+-+-+-+-+-+-+-+-+-+-+-+-+-+-+
~                        Bridge Identifier 1                    ~
+-+-+-+-+-+-+-+-+-+-+-+-+-+-+-+-+-+-+-+-+-+-+-+-+-+-+-+-+-+-+-+-+
~                        Bridge Identifier 2                    ~
+-+-+-+-+-+-+-+-+-+-+-+-+-+-+-+-+-+-+-+-+-+-+-+-+-+-+-+-+-+-+-+-+
//                                                             //
//                          ...............                    //
+-+-+-+-+-+-+-+-+-+-+-+-+-+-+-+-+-+-+-+-+-+-+-+-+-+-+-+-+-+-+-+-+
~                        Bridge Identifier N                    ~
+-+-+-+-+-+-+-+-+-+-+-+-+-+-+-+-+-+-+-+-+-+-+-+-+-+-+-+-+-+-+-+-+
~                    Padding   ///
+-+-+-+-+-+-+-+-+-+-+-+-+-+-+-+-+///
```

FIG. 15

```
                                                              1600
                                                            ↙
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                          MAC Address 1                        |
+-+-+-+-+-+-+-+-+-+-+-+-+-+-+-+-+-+-+-+-+-+-+-+-+-+-+-+-+-+-+-+-+
| MAC Address 1 (contd.)        |        MAC Address 2          |
+-+-+-+-+-+-+-+-+-+-+-+-+-+-+-+-+-+-+-+-+-+-+-+-+-+-+-+-+-+-+-+-+
|                     MAC Address 2 (contd..)                   |
+-+-+-+-+-+-+-+-+-+-+-+-+-+-+-+-+-+-+-+-+-+-+-+-+-+-+-+-+-+-+-+-+
//                                                             //
//                                                             //
+-+-+-+-+-+-+-+-+-+-+-+-+-+-+-+-+-+-+-+-+-+-+-+-+-+-+-+-+-+-+-+-+
|                          MAC Address N                        |
+-+-+-+-+-+-+-+-+-+-+-+-+-+-+-+-+-+-+-+-+-+-+-+-+-+-+-+-+-+-+-+-+
```

FIG. 16

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Rsvd 1|      VID  1       | Rsvd 2|       VID  2             |
+-+-+-+-+-+-+-+-+-+-+-+-+-+-+-+-+-+-+-+-+-+-+-+-+-+-+-+-+-+-+-+-+
| Rsvd 3|      VID  3       | Rsvd 4|       VID  4             |
+-+-+-+-+-+-+-+-+-+-+-+-+-+-+-+-+-+-+-+-+-+-+-+-+-+-+-+-+-+-+-+-+
//                                                            //
//                                                            //
+-+-+-+-+-+-+-+-+-+-+-+-+-+-+-+-+-+-+-+-+-+-+-+-+-+-+-+-+-+-+-+-+
|             ….. .                | Rsvd N|       VID N       |
+-+-+-+-+-+-+-+-+-+-+-+-+-+-+-+-+-+-+-+-+-+-+-+-+-+-+-+-+-+-+-+-+
```

LOOP DETECTION IN ETHERNET PACKETS

BACKGROUND

Ethernet bridges are switches or bridges in an ethernet network that operate at the ethernet layer, which is included in a data link layer or layer 2 of the Open Systems Interconnection (OSI) model. The data link layer (or layer 2) supports node-to-node data transfer including detecting and possibly correcting errors that occur at the physical layer (or layer 1 of the OSI model). The data link layer can be subdivided into the medium access control (MAC) layer and a logical link control (LLC) layer. The MAC layer controls how devices in a network gain access to a medium and obtain permission to transmit data. The LLC layer identifies and encapsulates network layer (or layer 3 in the OSI model) protocols, as well as controlling error checking and frame synchronization. In some cases, ethernet bridges are implemented in routers such as provider edge routers in a public network. For example, a provider edge router can function as an ethernet bridge for an ethernet virtual private network (EVPN) service provided by a public network.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 15 illustrates a format of an RRE according to some embodiments.

FIG. 16 illustrates a medium access control (MAC) address used as a bridge identifier according to some embodiments.

FIG. 17 illustrates a list of bridge identifiers when TPID is 0xB001 and each bridge identifier is a 12-bit VID according to some embodiments.

DETAILED DESCRIPTION

Figure 1:
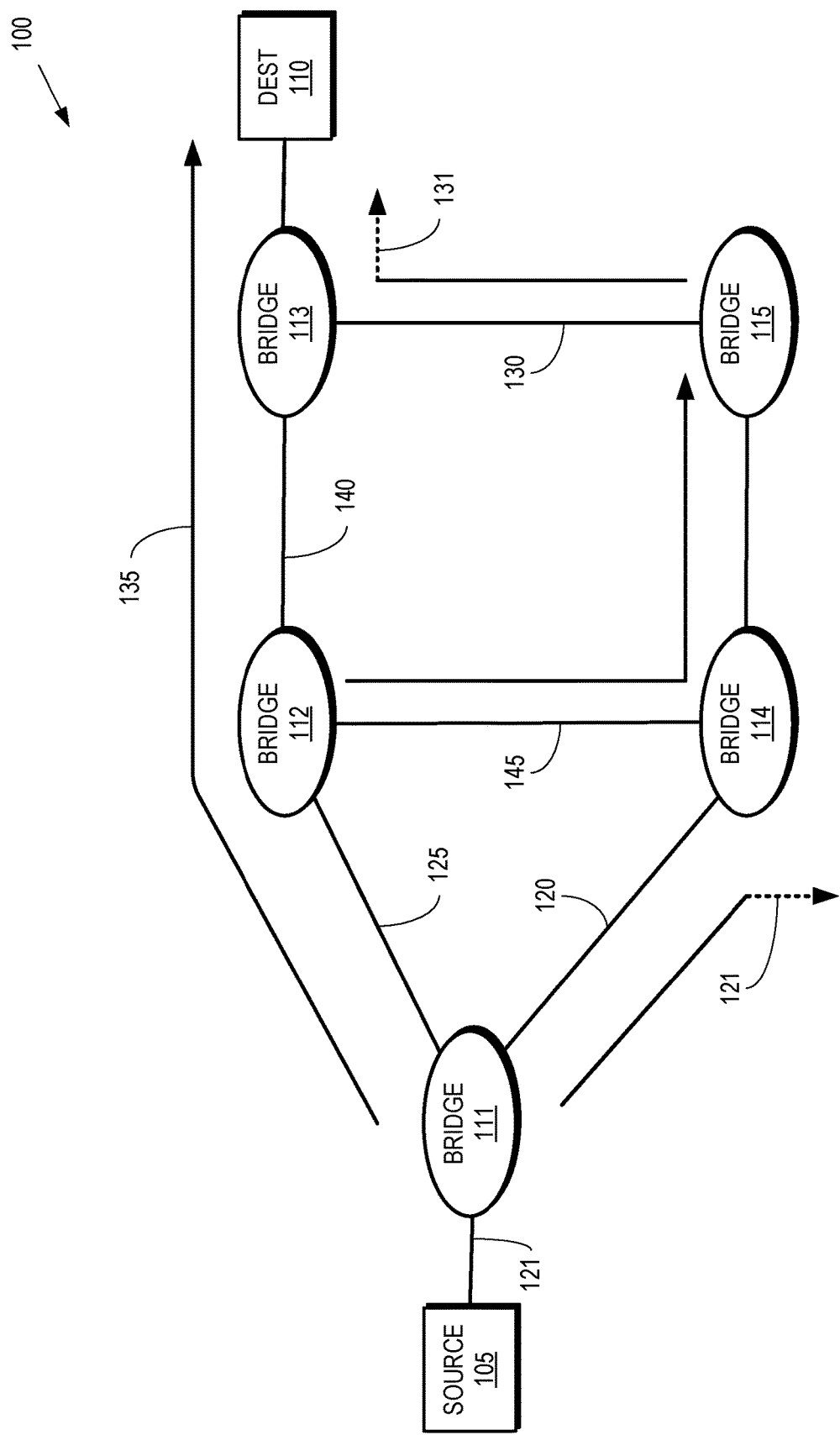
FIG. 1 is a block diagram of a communication system including an ethernet network that implements self-learning bridges according to some embodiments.

An ethernet bridge includes different ports to receive and transmit packets, and forwards packets between the different ports based on entries in a table such as a MAC forwarding table. The entries in the MAC forwarding table include destination MAC addresses and corresponding destination ports that are used by the ethernet bridge to forward data link layer packets. In some cases, the ethernet bridge is a "self-learning bridge" because the MAC forwarding table is constructed using MAC addresses in received packets. For example, an initially empty MAC forwarding table in an ethernet bridge is configured based on packets that traverse the ethernet bridge along a path from a source host (identified by a first MAC address) to a destination host (identified by a second MAC address). If the source host sends the packet from a first port to a second port at the destination host, the transmitted packet includes a tuple formed of the first MAC address and the second MAC address. The ethernet bridge examines the packet and adds an entry to its MAC forwarding table that includes the first MAC address received from the source. However, the MAC forwarding table does not include an entry for the second MAC address because the ethernet bridge has not received a packet from the destination host. To gather the information needed for an entry for the second MAC address, the ethernet bridge floods copies of the packet on all links connected to the ethernet bridge. The same process is repeated on other ethernet bridges until a copy reaches the destination host, which may respond with a new packet including the second MAC address. The originating ethernet bridge (and any intervening ethernet bridges) use the information received in the new packet to complete the entry in their MAC forwarding tables for the second MAC address.

A network of ethernet bridges typically includes redundant paths between two or more points in the network for resiliency. However, the redundant paths also cause the flooded ethernet packets to repeatedly traverse paths through the network, a process referred to herein as looping. Conventional networks avoid the loops in the packet forwarding paths by implementing protocols such as a spanning tree protocol (STP) or variations thereof. The STP protocol builds a loop-free logical topology for the ethernet network to prevent loops and unnecessary broadcast radiation of packets that results from the loops. Once the loop-free logical topology has been identified by the STP protocol, links that can create loops for packets traversing the network are blocked by the ethernet bridges. In some cases, the STP protocol identifies backup links to provide fault tolerance in the event of failure of an active link. The STP protocol can selectively activate or block the backup links depending on whether a corresponding active link has failed. However, implementing the STP protocol does not avoid all loops in networks of ethernet bridges.

Inconsistencies or errors in the MAC forwarding tables at one or more of the ethernet bridges can generate transient or permanent loops even after implementation of an STP protocol. For example, a transient loop can occur in response to a topology change before convergence of the STP protocol at all the ethernet bridges in the network. Transient loops typically resolve in response to convergence of the STP protocol, although the STP convergence time can be significant and grows with the size of the network. For another example, faulty behavior of an ethernet bridge can create a permanent loop that routes packets along a previously traversed path. The loops create broadcast storms in which the ethernet bridges flood broadcast and multicast packets from all their ports and repeatedly rebroadcast or remulticast the flooded packets into the network. The ethernet header does not support a time-to-live (TTL) or hop-count field so that packets that are transmitted into a loop topology can continue to loop forever. Conventional ethernet bridges detect loops by periodically transmitting a loop protocol packet and waiting to see if the loop protocol packet is returned to the ethernet bridge. If so, the ethernet bridge detects a loop and shuts down the port that received the packet. In some cases, a loop can produce incorrect entries in the MAC forwarding table that causes a looping packets to toggle between two ports. The ethernet bridge identifies loops by detecting the instability of a source MAC address between the different ports (since the path from a host to another host in the topology built by STP is symmetric). For example, when packets are looping, the ethernet bridge learns the source MAC address in the packets alternately from two different ports: (1) the port connected to the source, on which the packet actually arrived and (2) the port of arrival after completing the loop. The ethernet bridge shuts down the affected port(s) in response to detecting the instability. This is a drastic action because good (i.e., non-looping) packets also suffer due to shutting down of an entire port for the looping/bad packets.

Ethernet bridges can also be configured using shortest path bridging (SPB), which determines paths between the ethernet bridges in the network using link state protocols such as intermediate system-to-intermediate system (IS-IS). The link state protocol floods the status of locally connected networks and links of the ethernet bridges across the network. Each ethernet bridge builds an identical copy of the network topology based on the status information and then independently computes the paths to every other ethernet bridge (and any advertised networks), using path algorithms such as Dijkstra's Shortest Path First (SPF) algorithm, which computes the shortest paths between the nodes in a graph that represents the ethernet bridges in the network. The MAC forwarding table is therefore built using link state protocols based on an SPF algorithm instead of a MAC learning technique. However, as discussed above, inconsistencies or errors in the MAC forwarding tables can produce loops in the ethernet bridges that are configured using SPB, including micro-loops that cause packets to loop back and forth between a pair of ethernet bridges and macro-loops that traverse three or more ethernet bridges. The SPB routes are symmetric so that a route from one host to another is the same going back. This allows SPB to use some of the management and monitoring technologies already in use for self-learning bridges. For example, since the paths are symmetric, the loop detection techniques of self-learning bridges may be applied in SPB, provided the ethernet bridges can learn the source MAC addresses of received packets for loop detection purposes. However, the source MAC learning action is costly for SPB and even if implemented, is subject to the same limitations as mentioned earlier for the loop detection technique (e.g., the ethernet bridge shuts down the entire port and penalizes looping and non-looping packets). Secondly, it may be possible to relax current default behavior of symmetric routes to allow asymmetric routes. In that case, there is no loop detection mechanism.

In a border gateway protocol (BGP) EVPN, the provider edge (PE) routers host a bridging instance for each EVPN. For example, a PE router hosts a MAC forwarding table per EVPN. A packet conveyed from one host to another host within an EVPN may traverse a set of PE routers and each PE router forwards the packet to its next PE router based on the MAC forwarding table for the EVPN. Thus, the PE routers form the network of ethernet bridges for an EVPN instance. The entries in the MAC forwarding tables are built by BGP running among the PE routers. Host addresses of a directly connected EVPN site are advertised by the local PE router using BGP and the other PE routers participating in the EVPN accordingly learn the host addresses. Then, a PE router computes the best path for each known MAC address in the EVPN using conventional BGP procedures. This enables the forwarding of ethernet packets to take advantage of features of traditional IP routing, such as Equal Cost Multi-Path (ECMP) and asymmetric routing in which a route from one host to another may not be same going back to the original host. The PE routers do not implement a loop detection mechanism and, consequently, packets in the network could loop forever if there are errors or inconsistencies in a MAC forwarding table at a PE router or faulty behavior of BGP in a PE router.

FIGS. 1-27 disclose embodiments of an ethernet bridge that detects looping data link layer packets in a network of ethernet bridges after a single micro or macro-loop using a recorded route for ethernet (RRE) that is included in an ethernet header in the data link layer packets. Examples of data link layer packets include ethernet packets that are transmitted in the forwarding or data plane. The ethernet bridges in the network are assigned identifiers that uniquely identify the ethernet bridges within the network. Examples of bridge identifiers include virtual local area network (VLAN) identifiers that are assigned to the ethernet bridges from a central database of VLAN identifiers for the bridges in the network, a MAC address of the ethernet bridge, and the like. In response to receiving a packet, the ethernet bridge examines the identifiers in the RRE of the ethernet header in the data link layer packet. If the ethernet bridge does not find its unique identifier in the RRE, the ethernet bridge pushes its unique identifier onto the RRE and forwards the data link layer packet to the next hop based on information in the MAC forwarding table at the ethernet bridge. If the ethernet bridge detects its unique identifier in the RRE, which indicates that the data link layer packet has traversed a loop back to the ethernet bridge after the first reception of the packet at the ethernet bridge, the ethernet bridge drops the packet. In some embodiments, the ethernet bridge provides a loop detection notification that identifies the ethernet bridge and includes the RRE to facilitate diagnosis and repair of the loop. In some embodiments, loop detection is enabled for ethernet bridges in response to rerouting of a data link layer that encountered a link failure in the network. Ethernet bridges that implements selective enabling of loop detection also examine received packets to determine whether an RRE is present. If so, the ethernet bridge enables loop detection and examines the identifiers in the RRE of the ethernet header, as discussed above. An ingress ethernet bridge appends an RRE including its unique identifier to data link layer packets if loop detection is enabled, either selectively or by default.

FIG. 1 is a block diagram of a communication system 100 including an ethernet network that implements self-learning bridges according to some embodiments. The communication system 100 provides communication pathways to convey packets from a source 105 to a destination 110 via a set of ethernet bridges 111, 112, 113, 114, 115, which are collectively referred to herein as "the ethernet bridges 111-115." Although the term "bridge" as used to refer to the nodes in the ethernet network implemented in the communication system 100, nodes in an ethernet network are also referred to using other terms including "switches" and the phrase "ethernet bridge" used herein will be understood to refer generally to nodes in an ethernet network that operate at the ethernet layer of a protocol stack and receive/forward ethernet packets.

Ethernet bridges 111-115 use a table such as a media access control (MAC) forwarding table to control the forwarding of packets between ports of the ethernet bridges 111-115. Initially, the MAC forwarding table is empty and entries are added as the ethernet bridges 111-115 receive packets. The source MAC address of a packet received by one of the ethernet bridges 111-115 is added as an entry in the corresponding MAC forwarding table with the port of arrival as the forwarding port for the MAC address. If the destination MAC address entry is not found in the MAC forwarding table, the packet is flooded to all other ports of the receiving ethernet bridge 111-115, except the port from which the packet was received. In response to receiving one of these flooded packets, a host in the communication system 100 (such as the destination 110) may respond with a packet that includes the destination MAC address as the source address MAC address of the packet. The originating ethernet bridge 111-115 uses the response packet to create a MAC database entry. Both source and destination addresses are used in this process: source addresses are recorded as entries in the MAC forwarding table, while destination addresses are looked up in the table and matched to the proper port to send the packet to. The ethernet bridges 111-115 are also termed as "self-learning bridges" since MAC forwarding table is built automatically by snooping source MAC addresses of received packets.

In the illustrated embodiment, the ethernet network in the communication system 100 includes redundant paths between the source 105 and the destination 115 for resiliency. However, the redundant paths can also cause loops for flooded ethernet packets. To avoid loops in packet forwarding paths, the conventional ethernet network shown in FIG. 1 deploys a Spanning Tree Protocol (STP) or one of its variants such as rapid spanning tree protocol (RSTP), multiple spanning tree protocol (MSTP), and the like. As used herein, the term "STP" refers to all such loop resolution protocols used in traditional ethernet bridging. The STP procedure builds a loop-free logical topology for ethernet networks and the basic function is to prevent loops and the broadcast radiation that results from them. The STP procedure also allows a network design to include backup links providing fault tolerance if an active link fails. For example, STP is enabled on all interconnecting links between the ethernet bridges 111-115. As a result, the ethernet bridge 114 blocks the link 120, as indicated by the dashed arrow 121, which means the ethernet bridge 114 does not forward or receive packets on the link 120. The STP triggers the ethernet bridge 114 to activate the link 120 in response to failure of the link 125. For another example, the ethernet bridge 113 blocks the link 130, as indicated by the dashed arrow 131. As a result, the ethernet network provides a loop free logical topology (a tree, represented by the arrow 135) interconnecting the ethernet bridges 111, 113.

The source 105 identified by the MAC address M1 sends an ethernet packet to a destination 110, which is identified by MAC address M2. The packet is received by the ethernet bridge 111, which adds the entry for M1 into the MAC forwarding table with the link 121 as the forwarding port. The ethernet bridge 111 does not find any entry for M2 in the table, so it floods the packet on all links, e.g., on the link 120 and the link 125. The ethernet bridge 114 drops the copy of the packet it receives on the link 120, which is blocked by STP. Similarly, the other ethernet bridges 111-115 flood the packet and a copy eventually reaches the destination 110, which may generate a response packet in response to receiving the copy. The ethernet bridges 111-115 eventually receive a copy of the response packet. The ethernet bridges 111-115 use the exchanged packets to create entries in the MAC forwarding tables. For example, the ethernet bridges 111-115 uses the information in the original packet (or copy thereof) to learn the MAC address M1 of the source 105. The ethernet bridges 111-115 install entries for the source 105 (and corresponding MAC address M1) in their respective MAC forwarding tables. If the destination 110 subsequently sends an ethernet packet to the source 105, then the ethernet bridges 111-115 forward (unicast) the packet to its designated port based on the entry for M1 in their MAC forwarding tables. For another example, the ethernet bridges 111-115 use the information in the response packet (or copy thereof) to learn the MAC address M2 of the destination 110. The ethernet bridges 111-115 uses information to install entries for the destination 110 (and corresponding MAC address M2) in their respective MAC forwarding tables. If the source 105 subsequently sends a packet to the destination 110, the ethernet bridges 111-115 do not perform packet flooding since an entry for M2 exists in MAC forwarding tables in the ethernet bridges 111-115.

Although STP is intended to prevent loops in the ethernet network of the communication system 100, loops can occur in some circumstances. Transient loops occur in the ethernet network during STP convergence across the network due to topology changes. Faulty behaviour of one or more of the ethernet bridges 111-115 can cause permanent loops. For example, a failure of one of the ethernet bridges 111-115 can redirect ethernet data packets along an incorrect path so that the packets re-enter a previously traversed path. This permanently creates broadcast storms as broadcasts and multicasts of the packet are forwarded out of every port as the ethernet bridges 111-115 flood the ethernet network with copies of the packets. Furthermore, the ethernet header does not support a time-to-live (TTL) field or a hop count field so ethernet packets that are sent into a looped topology can continue to loop forever.

Loops are detected in some cases using a looped detection protocol that runs atop the ethernet protocol. For example, when loop detection is enabled on a port of an ethernet bridge 111-115, the port periodically transmits and ethernet multicast packet with a user-defined MAC address. The ethernet bridge 111-115 then waits to see if the loop detection packet is returned to the ethernet bridge 111-115, which indicates the presence of the loop. If the ethernet bridge 111-115 detects a loop on a port, the ethernet bridge 111-115 shuts down the port that receive the packet. For another example, loops generate erroneous or misleading entries in the MAC forwarding table of an ethernet bridge 111-115 because the looping packet would toggle between two arriving ports and the ethernet bridge 111-115 would learn the same source MAC address from at least two different ports. The ethernet bridge 111-115 can therefore detect a loop by identifying a port instability (e.g., toggling of learnt MAC address between multiple ports) in the MAC forwarding table. In this case the ethernet bridge 111-115 also shuts down the ports associated with the looping packet. Shutting down the ports is a brute force technique that also impacts packets that are not in a loop.

Conventional ethernet bridging using the STP technique also has other limitations. The STP convergence of the ethernet network is relatively slow and inefficient. Furthermore, the convergence time depends on the size of the network and can require minutes to converge in some cases. The size dependence of the STP convergence time also sets a limit on the size of the ethernet network. Multipath routing is also not possible in an ethernet network that uses STP because the MAC addresses learned by the ethernet bridges 111-115 are bound to specific links. Thus, all packets destined to the same MAC address are forwarded along the same (fixed) path through the network.

Figure 2:
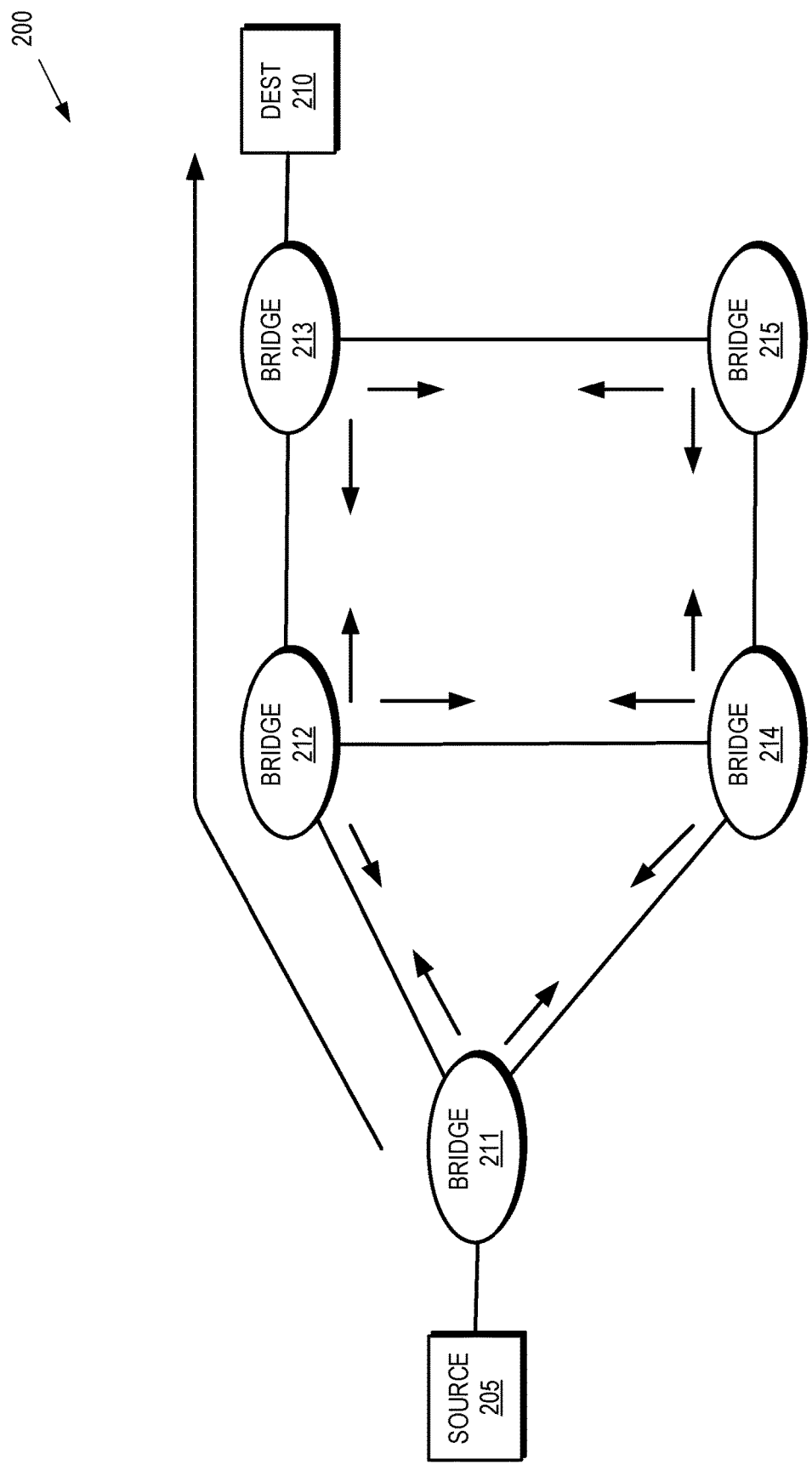
FIG. 2 is a block diagram of a communication system including an ethernet network that implements shortest path bridging (SPB) according to some embodiments.

FIG. 2 is a block diagram of a communication system 200 including an ethernet network that implements shortest path bridging (SPB) according to some embodiments. The communication system 200 provides communication pathways to convey packets from a source 205 to a destination 210 via a set of ethernet bridges 211, 212, 213, 214, 215, which are collectively referred to herein as "the ethernet bridges 211-215." SPB allows multiple equal cost paths to be active concurrently, provides larger layer ethernet topologies, supports faster convergence times, and improves efficiency by allowing traffic to load chair across multiple paths in the network. SPB provides logical Ethernet networks on native Ethernet infrastructures using a link state protocol to advertise both topology and logical network membership. The control plane of the ethernet network is based on the Intermediate System to Intermediate System (IS-IS) routing protocol and is equivalent to Interior Gateway Protocols (IGPs) such as OSPF, IS-IS, OSPFv3 based IP networks in the ethernet networks. The ethernet bridges 211-215 that implement SPB are not self-learning bridges. Instead, the ethernet bridges 211-215 build MAC forwarding tables based on the topology database built by link state protocols. The ethernet bridges 211-215 compute the paths to all external MAC addresses in the topology database by using the Shortest Path First (SPF) algorithm and installing entries in MAC forwarding tables. Since there is no self-learning action, there is no unnecessary flooding of packets in SPB when a packet needs to be sent to an unknown destination MAC address. If destination MAC address of a packet is not found in MAC forwarding table then the packet is dropped.

In the illustrated embodiment, the ethernet bridges 211-215 flood topology information across the network, e.g., using IS-IS as the link state protocol. As a result, an identical topology database is built by each of the ethernet bridges 211-215. Based on the topology database, the ethernet bridges 211-215 independently compute the shortest path to every other known destination MAC address and installs entries in their MAC forwarding tables. For example, the ethernet bridges 211-215 compute shortest paths to the source 205 (indicated by the MAC address M1) and the destination 210 (indicated by the MAC address M2). Entries for the MAC addresses M1, M2 are therefore installed in the MAC forwarding tables of the ethernet bridges 211-215. When the source 205 sends a packet to the destination 210, an entry to M2 already exists in the MAC forwarding tables and the packet is unicasted by each transiting bridge (e.g., the ethernet bridges 211-213) towards the destination 210. In some embodiments, there are multiple equal cost paths between the ingress ethernet bridge 211 and the egress ethernet bridge 213. For example, equal cost paths may include a first path along ethernet bridge 211→ethernet bridge 212→ethernet bridge 213 and a second path along ethernet bridge 211→ethernet bridge 214→ethernet bridge 215→ethernet bridge 213. Packets transmitted from the source 205 to the destination 210 can therefore be load balanced between the two paths by the source 205.

Loops can occur in the ethernet network of the communication system 200 for various reasons. The loops include micro-loops that are formed between pairs of the ethernet bridges 211-215 and macro-loops that include more than two of the ethernet bridges 211-215.

Figure 3:
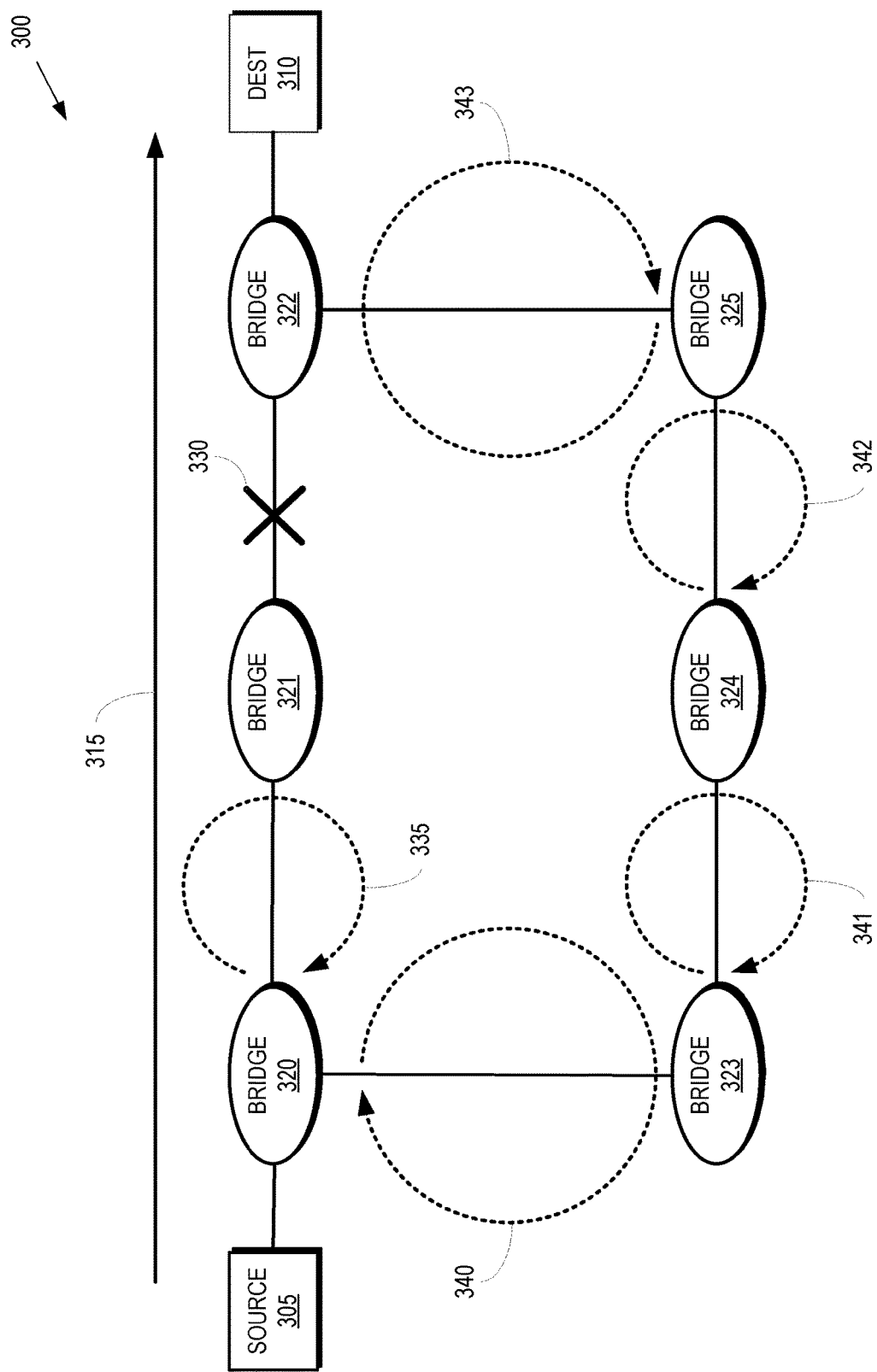
FIG. 3 is a block diagram of a communication system that has developed micro-loops during SPB convergence according to some embodiments.

FIG. 3 is a block diagram of the communication system 300 that has developed micro-loops during SPB convergence according to some embodiments. The communication system 300 provides communication pathways to convey packets from a source 305 to a destination 310, as indicated by the arrow 315. The source 305 and the destination 310 are implemented in one or more entities such as desktop computers, laptop computers, tablet computers, smart phones, Internet of Things (IoT) devices, and the like. The communication system 300 includes a set of ethernet bridges 320, 321, 322, 323, 324, 325, which are collectively referred to herein as "the ethernet bridges 320-325."

Packets are conveyed from the source 305 to the destination 310 along a path that includes the ethernet bridges 320-322. In the illustrated embodiment, a link between the ethernet bridge 321 and the ethernet bridge 322 fails, as indicated by the cross 330. In response to failure of the link, the ethernet bridge 321 sends a link state update that informs the ethernet bridges 320-325 that the link has failed. The SPF algorithm implemented in the ethernet bridges 320-325 eventually recomputes their respective paths to 305 and 310 based on the modified topology. For some of the ethernet bridges the path to 305 or 310 may change or may not change depending on whether the link 330 was along the shortest paths to the respective hosts. Due to failure of the link 320, the shortest path from the source 305 to the destination 310 is from the ethernet bridge 320 to the ethernet bridge 322 via the ethernet bridges 323-325. Each bridge independently computes SPF algorithm and eventually updates their MAC forwarding table entry for 310 along that path. However, the SPF algorithm takes a finite amount of time to converge at the ethernet bridges 320-325 and does not necessarily converge at the same time at all the ethernet bridges 320-325, which can result in the ethernet bridges 320-325 forwarding packets to 310 along an inconsistent path.

Loops form between the ethernet bridges 320-325 while the SPF algorithms are converging at the ethernet bridges 320-325. For example, if the SPF algorithm at the ethernet bridge 321 converges before the SPF algorithm at the ethernet bridge 320, the ethernet bridge 320 continues to forward packets to the ethernet bridge 321 (along the original shortest path) and the ethernet bridge 321 forwards the packets back to the ethernet bridge 320 (along the new shortest path), thereby forming a loop 335. In response to the SPF algorithm converging at the ethernet bridge 320, the ethernet bridge 320 forwards packets to the ethernet bridge 323. However, if the SPF algorithm has not yet converged at the ethernet bridge 323, the ethernet bridge 320 forwards packets to the ethernet bridge 323 (along the new shortest path) and the ethernet bridge 323 forwards the packets back to the ethernet bridge 320 (along the original shortest path) thereby forming a loop 340. In a similar manner, loops 341, 342, 343 can form while the SPF algorithm is converging at the ethernet bridges 322, 324, 325. The loops 335, 340-343 form between pairs of ethernet bridges 320-325 and are therefore referred to herein as micro-loops. The duration of the loops is proportional to the time required to propagate the topology change through the network, as well as the time required for the SPF algorithm to converge at the ethernet bridges 320-325 and for the ethernet bridges 320-325 to update the MAC forwarding tables.

In principle, the effects of the micro-loops could be eliminated by speeding the whole convergence process to almost zero, but fundamental limits such as the speed of light and memory update latency make this highly unlikely or impossible. Some embodiments of ethernet networks reduce the impact of transient loops using Fast-Rerouting (FRR) of packets in an SPB network. The FRR technique uses loop free alternate (LFA) paths computed by link state protocols as a backup path if the backup path doesn't cause a forwarding loop. To avoid forwarding loops, the ethernet bridges 320-325 perform additional calculations to verify that a candidate backup path does not create a forwarding loop. A path that does not cause a forwarding loop is identified as an LFA path. The ethernet bridges 320-325 identify the LFA paths in advance and install them against the respective primary paths (shortest paths) into the MAC forwarding table.

Figure 4:
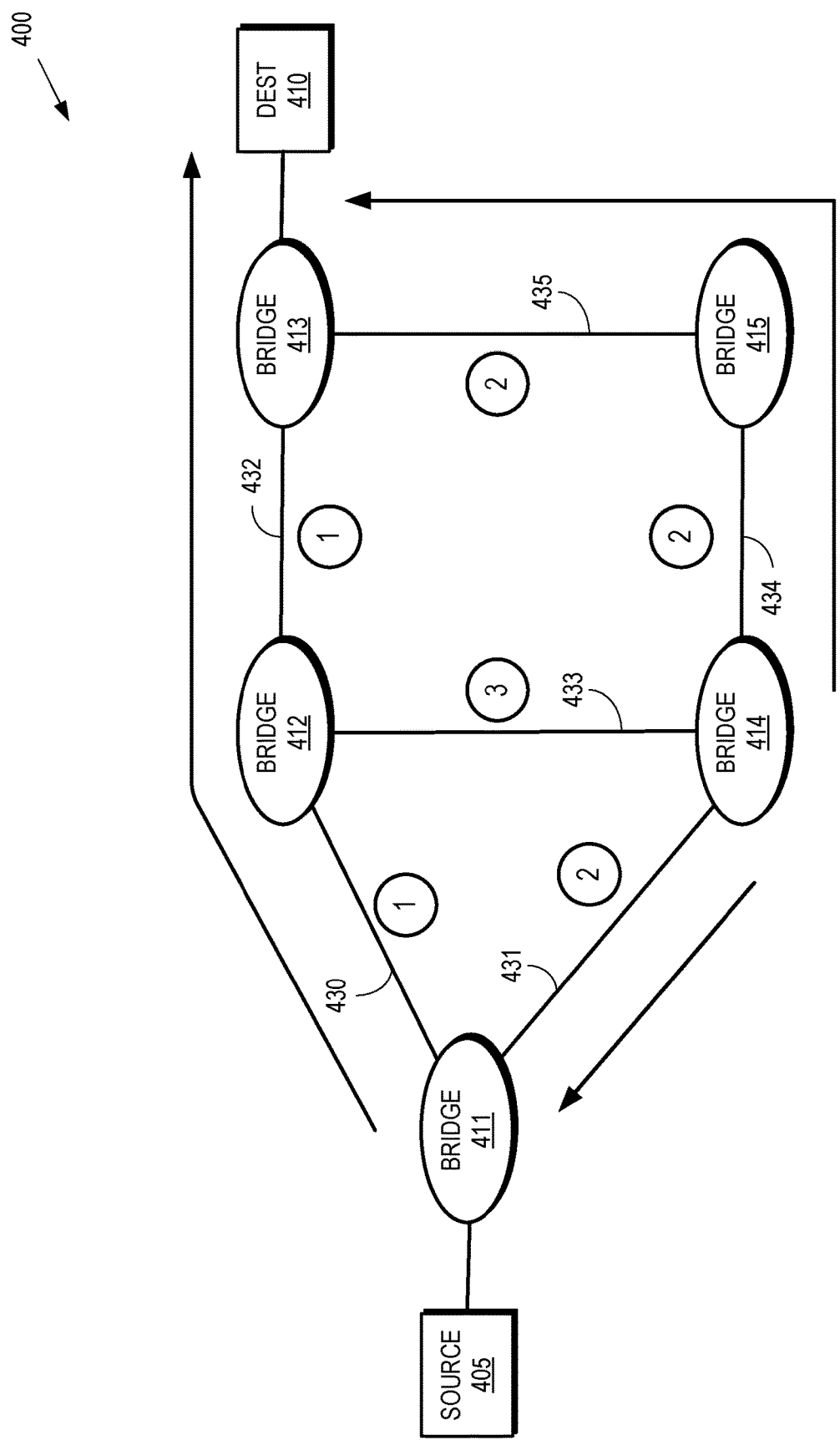
FIG. 4 is a block diagram of a communication system that computes backup paths based on metrics or costs associated with links according to some embodiments.

FIG. 4 is a block diagram of a communication system 400 that computes backup paths based on metrics or costs associated with links according to some embodiments. The communication system 400 provides communication pathways to convey packets from a source 405 to a destination 410. The communication system 400 includes a set of ethernet bridges 411, 412, 413, 414, 415, which are collectively referred to herein as "the ethernet bridges 411-415." The ethernet bridges 411-415 are interconnected by corresponding links 430, 431, 432, 433, 434, 435, which are collectively referred to herein as "the links 430-435." The metric or cost of the links 430-435 are shown in circles alongside the links 430-435.

In the illustrated embodiment, the ethernet bridge 411 is connected to the source 405 of ethernet packets and therefore calculates paths through the communication system 400. The ethernet bridges 412, 414 are neighbors of the ethernet bridge 411. The ethernet bridge 413 is connected to the destination 410 and so the ethernet bridge 413 advertises the destination 410 as a local destination in the link state protocol. The ethernet bridge 411 computes the shortest path to the ethernet bridge 413 as ethernet bridge 411→ethernet bridge 412→ethernet bridge 413, which is a total cost of 2. For this path, the ethernet bridge 412 is the primary next hop. The ethernet bridge 411 also computes an alternate, loop-free, path as ethernet bridge 411→ethernet bridge 414→ethernet bridge 415→ethernet bridge 413 because the shortest path to 413 from the ethernet bridge 414 is not through the local router 411. Traffic sent by the ethernet bridge 411 to the backup next hop 414 is not sent back to the ethernet bridge 411 so the ethernet bridge 411 can use the ethernet bridge 414 as a backup next hop for the path to the ethernet bridge 413. The ethernet bridge 411 therefore programs the path to the ethernet bridge 413 (and all its attached hosts) into its MAC forwarding table with the ethernet bridge 412 is the primary next hop and the ethernet bridge 414 as the backup next hop. In response to the link 430 failing, the ethernet bridge 411 fast reroutes ethernet packets to the ethernet bridge 413 via the backup next hop which is the ethernet bridge 414, which forwards the packets along the primary path ethernet bridge 414→ethernet bridge 415→ethernet bridge 413.

In some embodiments, the ethernet bridge 414 computes an LFA path to the ethernet bridge 413 to protect against failure of its primary next-hop ethernet bridge 415. As evident from the topology, the alternate path ethernet bridge 414→ethernet bridge 411→ethernet bridge 412→ethernet bridge 413 (total cost 3) is loop-free, because the shortest path for the ethernet bridge 411 (ethernet bridge 411→ethernet bridge 412→ethernet bridge 413, cost 2) is not via the ethernet bridge 414. Thus, the ethernet bridge 414 programs the ethernet bridge 413 (and all its attached hosts) into its MAC forwarding table with the ethernet bridge 415 as the primary next-hop and the ethernet bridge 411 as backup next-hop.

Figure 5:
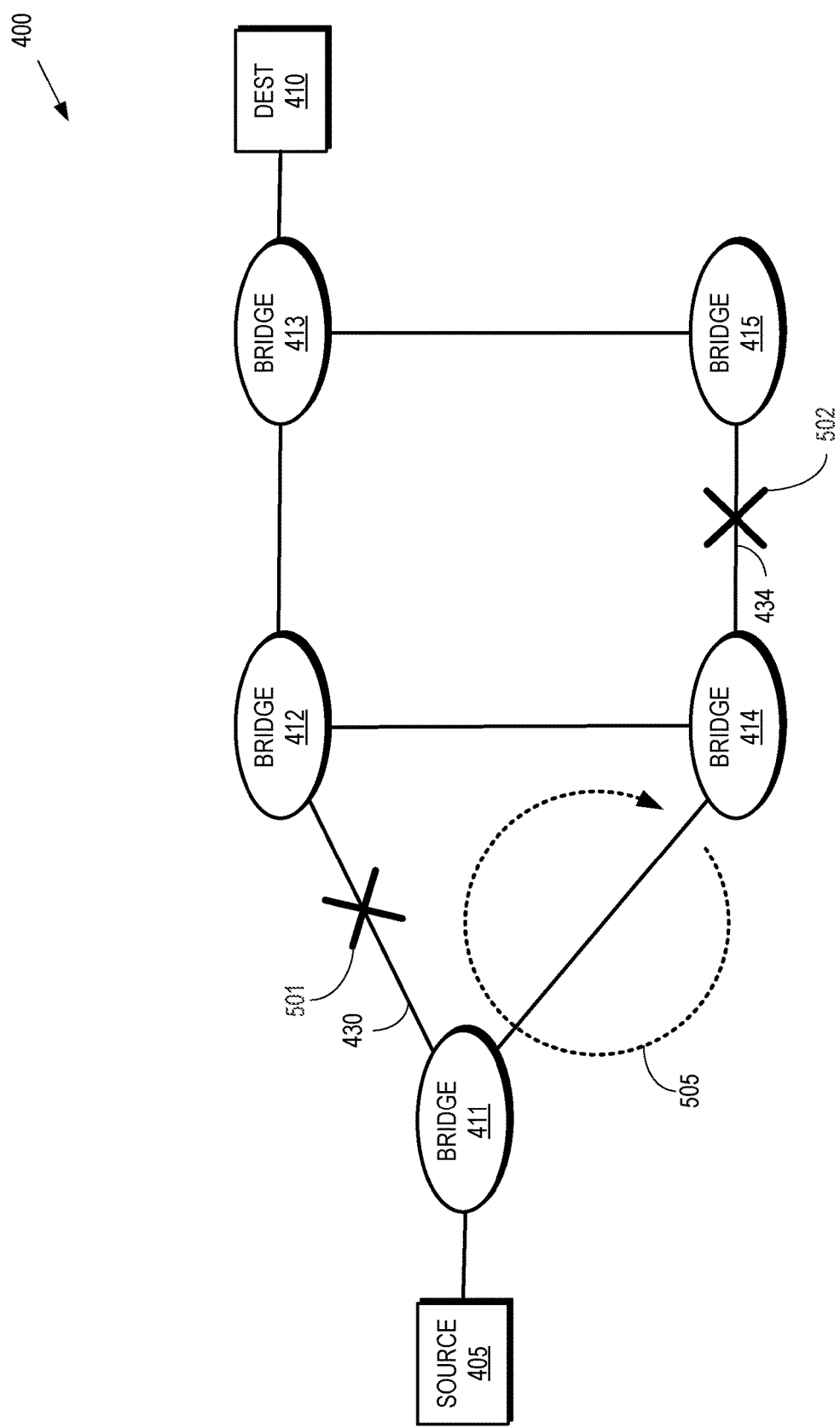
FIG. 5 is a block diagram of the communication system shown in FIG. 4 that uses the backup paths during concurrent failure of multiple links according to some embodiments.

FIG. 5 is a block diagram of the communication system 400 that uses the backup paths during concurrent failure of multiple links according to some embodiments. In the illustrated embodiment, the link 430 between the ethernet bridge 411 and the ethernet bridge 412 fails concurrently with the link 434 between the ethernet bridge 414 and the ethernet bridge 415, as indicated by the crosses 501, 502. Thus, both the primary path and the alternate path that were previously calculated using the SPF algorithms in the ethernet bridges 411-415 are interrupted by the concurrent link failures. Failure of the link 430 between the ethernet bridge 411 and the ethernet bridge 412 causes the ethernet bridge 411 to fast reroute packets along the alternate path to the next hop ethernet bridge 414. However, failure of the link between the ethernet bridge 414 and the ethernet bridge 415 causes the ethernet bridge 414 to fast reroute packets along the alternate path to the next hop ethernet bridge 411. A loop 505 is therefore formed between the ethernet bridge 411 and the ethernet bridge 414 due to the multiple link failures. The loop 505 persists until the SPF algorithms executed by the ethernet bridges 411-415 converge to a new solution in the presence of the link failures, e.g., a new shortest path from the source 405 to the destination 410 that conveys packets along a path from the ethernet bridge 411 to the ethernet bridge 414 to the ethernet bridge 412 to the ethernet bridge 413.

Figure 6:
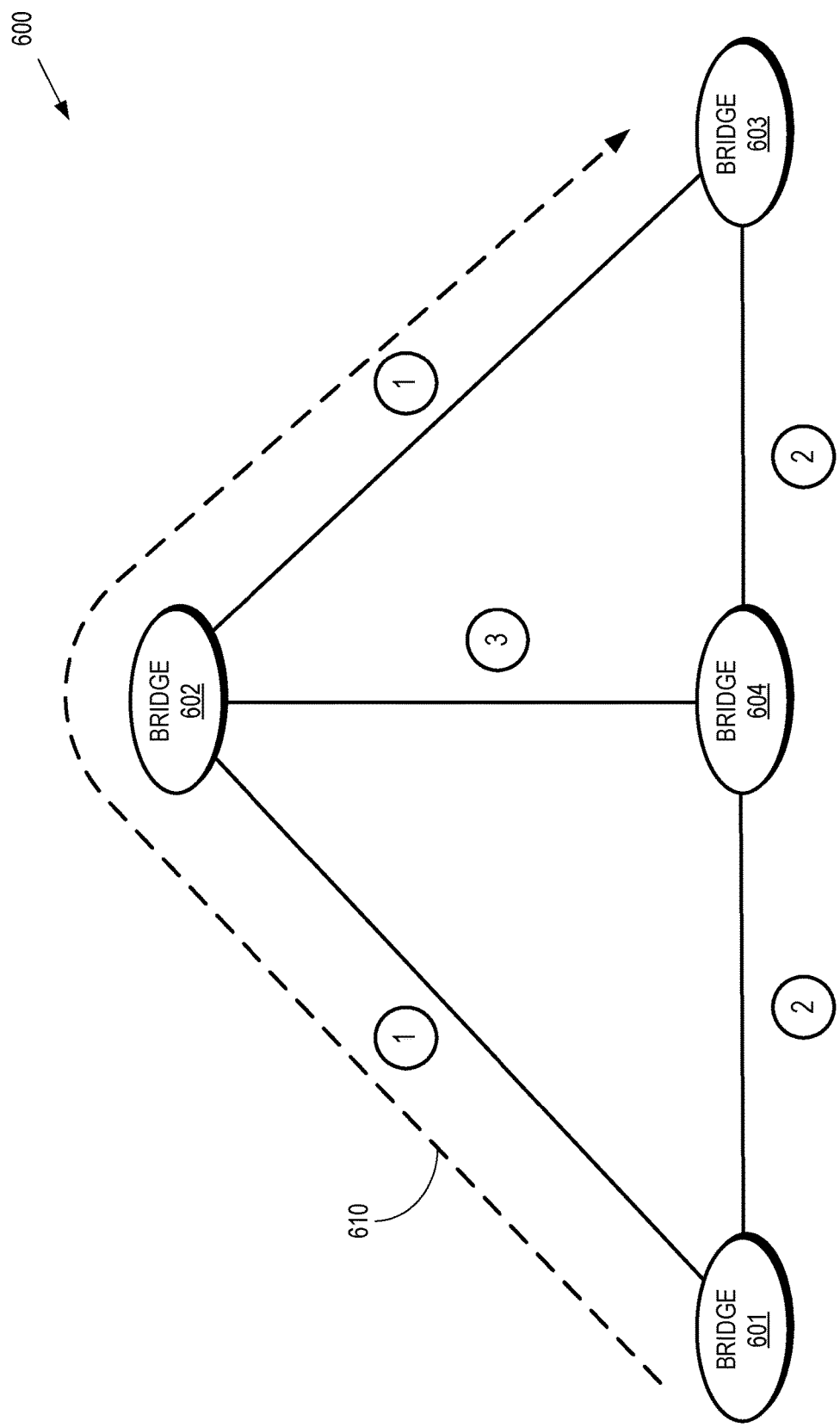
FIG. 6 is a block diagram of a communication system that determines a primary shortest path and an alternate shortest path using a shortest path first (SPF) algorithm according to some embodiments.

FIG. 6 is a block diagram of a communication system 600 that determines a primary shortest path and an alternate shortest path using a shortest path first (SPF) algorithm according to some embodiments. The communication system 600 includes ethernet bridges 601, 602, 603, 604, which are collectively referred to herein as "the ethernet bridges 601-604." In the illustrated embodiment, the ethernet bridge 601 is a source router that is connected to a source and the ethernet bridge 603 is a destination router that is connected to a destination. The metrics or costs of the links are indicated in the circled numerals. For example, the cost of the link between the ethernet bridge 601 and the ethernet bridge 602 is one and the cost of the link between the ethernet bridge 602 and the ethernet bridge 604 is three.

The ethernet bridges 601, 602, 604 compute the primary and alternate shortest paths to the destination ethernet bridge 603 based on the metrics or costs. The ethernet bridge 601 computes a primary path that includes the ethernet bridges 601, 602, 603 (at a cost of two) and an alternate path that includes the ethernet bridges 601, 604, 603 (at a cost of four). The primary path from the ethernet bridge 601 to the ethernet bridge 603 as indicated by the arrow 610. The ethernet bridge 602 computes a primary path that includes the ethernet bridges 602, 603 (at a cost of one) and an alternate path that includes the ethernet bridges 602, 604, 603 (at a cost of five). The ethernet bridge 604 computes a primary path that includes the ethernet bridges 604, 603 (at a cost of two) and an alternate path that includes the ethernet bridges 604, 601, 602, 603 (at a cost of four).

Figure 7:
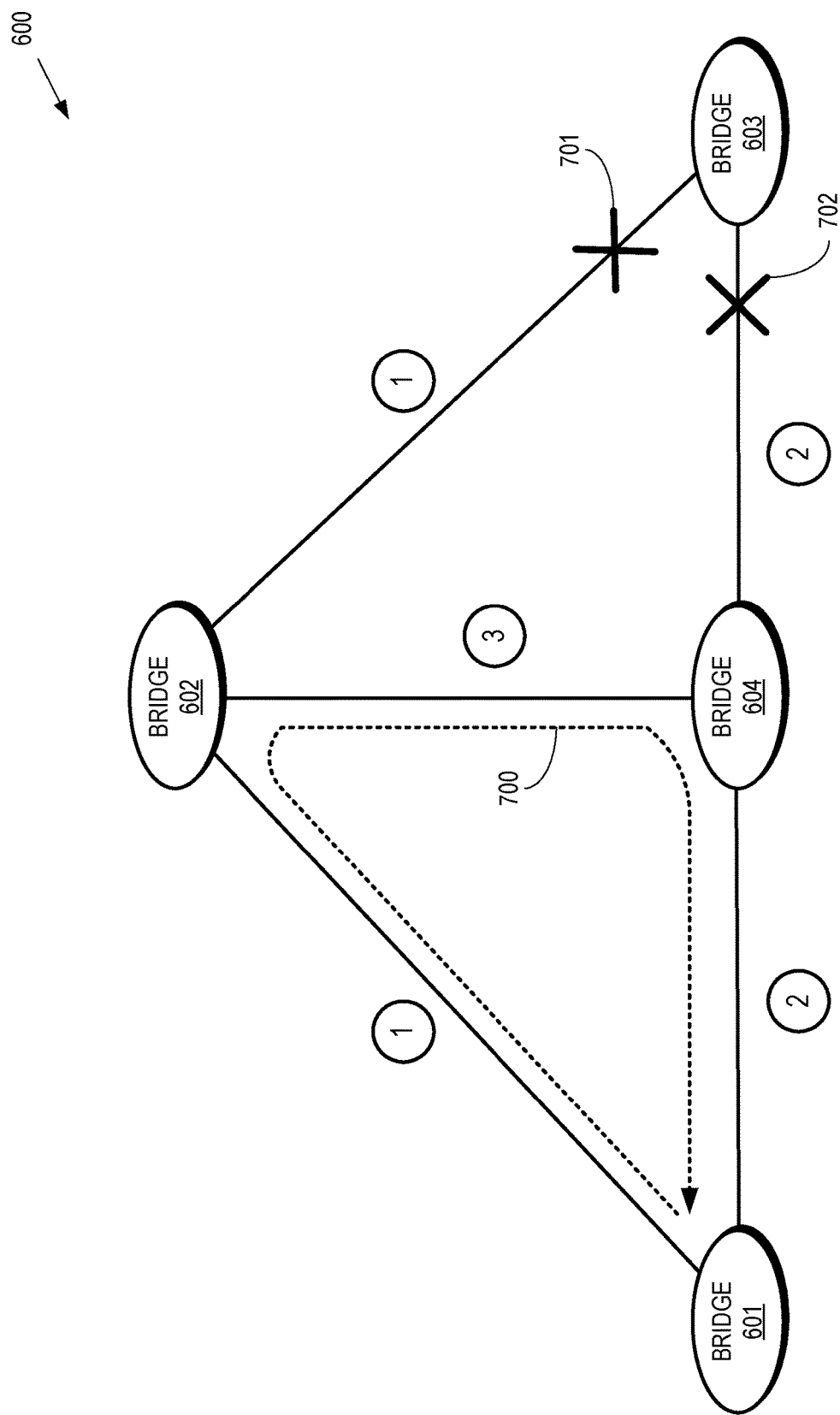
FIG. 7 is a block diagram of the communication system shown in FIG. 6 that forms a macro-loop in response to concurrent failure of multiple links according to some embodiments.

FIG. 7 is a block diagram of the communication system 600 that forms a macro-loop 700 in response to concurrent failure of multiple links according to some embodiments. In the illustrated embodiment, the link between the ethernet bridge 602 and the ethernet bridge 603 fails concurrently with the link between the ethernet bridge 604 and the ethernet bridge 603, as indicated by the crosses 701, 702. In response to receiving a packet from the ethernet bridge 601, the ethernet bridge 602 detects the failure of the link to the ethernet bridge 603 and reroutes the received packet via its previously calculated alternate path to the next hop ethernet bridge 604. In response to receiving the packet from the ethernet bridge 602, the ethernet bridge 604 detects the failure of the link to the ethernet bridge 603 and reroutes the received packet via its previously calculated alternate path to the ethernet bridge 601, which forwards the packet via its primary path to the ethernet bridge 602, thereby forming a macro-loop 700 including the ethernet bridges 601, 602, 604. In this case, the macro-loop 700 resolves in response to convergence of the SPF algorithm at the ethernet bridges 601-604 following the link failures.

Macro-loops also form in the communication system 600 in non-failure scenarios. For example, if the ethernet bridges 601, 604 incorrectly compute the shortest paths or incorrectly update the MAC forwarding table based on a correctly computed shortest path, the macro-loop 700 can form in the communication system 600. In response to receiving a packet from the ethernet bridge 601, the ethernet bridge 602 forwards the received packet based on the incorrectly calculated or stored shortest path to the next hop ethernet bridge 604. In response to receiving the packet from the ethernet bridge 602, the ethernet bridge 604 forwards the received packet based on the incorrectly calculated or stored shortest path to the ethernet bridge 601, which forwards the packet via its primary path to the ethernet bridge 602, thereby forming the macro-loop 700 including the ethernet bridges 601, 402, 404. In this case, the macro-loop 700 is not transient and may not be resolved without intervention.

Traditionally, SPB routes are symmetric so that a route from one host to another is the same going back to the original host. This allows SPB to use some of the management and monitoring technologies already in use for self-learning bridges. For example, since the paths are symmetric, the loop detection techniques of self-learning bridges may be applied in SPB, provided the ethernet bridges employing SPB can also learn the source MAC addresses of received packets for loop detection purposes. However, the source MAC learning action is costly for SPB and even if implemented, is subject to the same limitations as mentioned earlier for the loop detection technique (e.g., the ethernet bridge shuts down the entire port and penalizes looping and non-looping packets). Secondly, it may be possible to relax current default behavior of symmetric routes to allow asymmetric routes. In that case, there is no loop detection mechanism in SPB.

Figure 8:
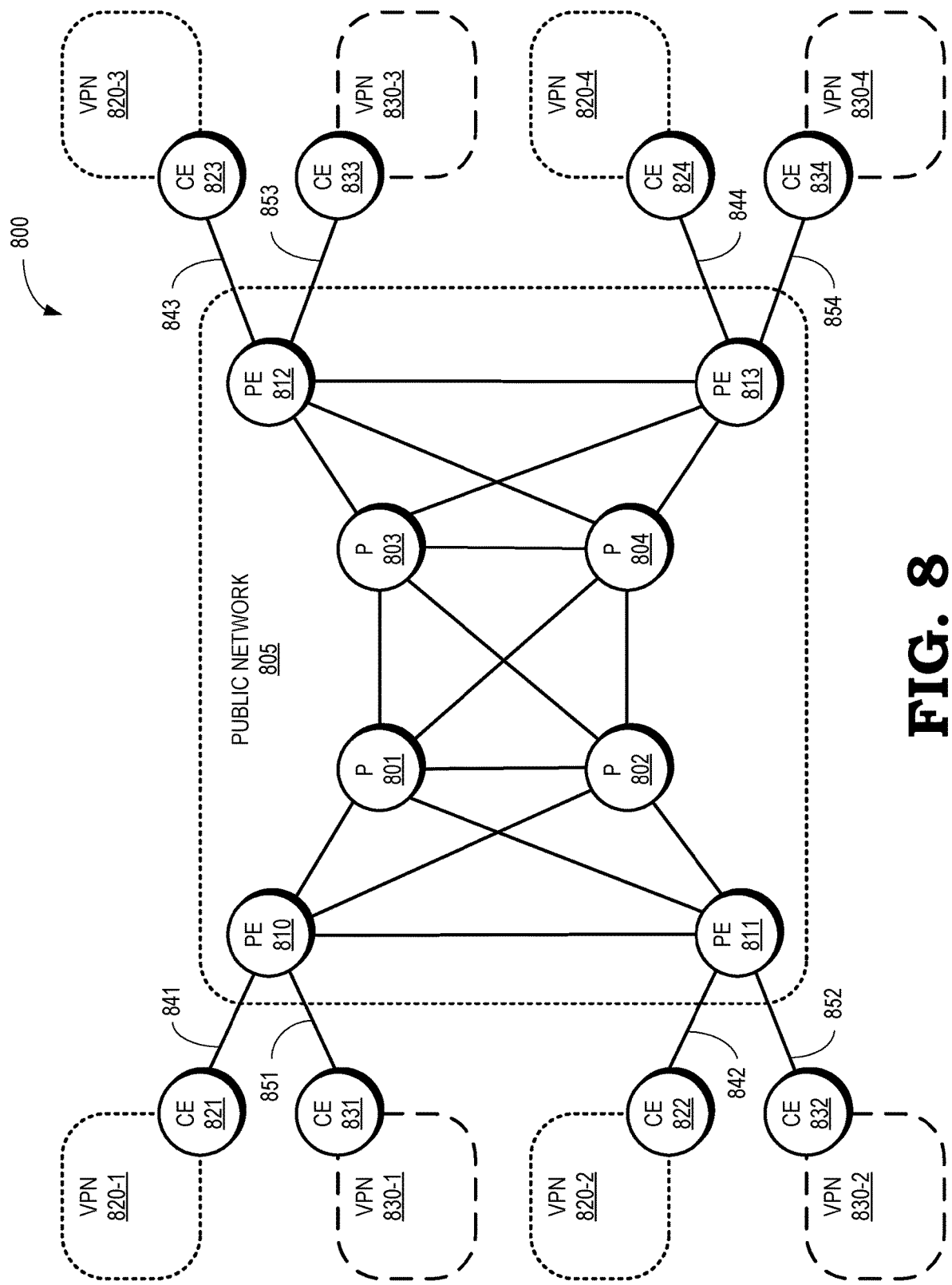
FIG. 8 is a block diagram of a communication system that includes a public network that provides virtual private network (VPN) services for multiple VPNs according to some embodiments.

FIG. 8 is a block diagram of a communication system 800 that includes a public network 805 that provides VPN services for multiple VPNs according to some embodiments. The public network 805 includes transit or provider (P) routers 801, 802, 803, 804 (collectively referred to herein as "the routers 801-804") that route packets through the public network 805 based on information included in the packets and forwarding tables stored in the P routers 801-804. The public network 805 also includes PE routers 810, 811, 812, 813, which are collectively referred to herein as "the PE routers 810-813." The PE routers 810-813 are gateways that provide access to services offered by the public network 805, such as VPN services. In the illustrated embodiment, the PE routers 810-813 act as ethernet bridges for the VPN sites described below.

In the illustrated embodiment, the public network 805 offers connectivity between remote sites of two VPNs 820, 830. The VPN 820 includes a remote site 820-1 that is connected to the PE router 810 in the public network 805 by a customer edge (CE) router 821 via an access link 841, a remote site 820-2 that is connected to the PE router 811 by a CE router 822 via an access link 842, a remote site 820-3 that is connected to the PE router 812 by a CE router 823 via an access link 843, and a remote site 820-4 that is connected to the PE router 813 by a CE router 824 via an access link 844. The VPN 830 includes a remote site 830-1 that is connected to the PE router 810 in the public network 805 by a CE router 831 via an access link 851, a remote site 830-2 that is connected to the PE router 811 by a CE router 832 via an access link 852, a remote site 830-3 that is connected to the PE router 812 by a CE router 833 via an access link 853, and a remote site 830-4 that is connected to the PE router 813 by a CE router 834 via an access link 854. The PE routers 810-813 identify the VPNs 820, 830 that provided packets based on the access links 841-844, 851-854 that conveyed the packets to the PE routers 810-813. In the illustrated embodiment, the PE routers 810-813, and the CE routers 831-834 act as ethernet bridges for the VPN sites 820, 830.

Within the public network 805, only the PE routers 810-813 maintain VPN-specific forwarding states. Some embodiments of the PE routers 810-813 maintain private forwarding tables for each VPN associated with the PE router. The private forwarding tables are sometimes referred to as "native VPN forwarding tables" in the following discussion. The native VPN forwarding tables in the PE routers 810-813 contain the forwarding rules for the "native" packet type of the VPN. For example, the native packet type is an IP packet in an IP-VPN, the native packet type is an Ethernet packet for an Ethernet based VPN, etc. When the PE routers 810-813 are operating as ingress routers, the forwarding rules in the native VPN forwarding tables are used to match and forward native packets received from a local VPN site via the access links 141-144, 151-154 to one or more remote PE routers 810-813. When the PE routers 810-813 are operating as egress routers, the forwarding rules in the native VPN forwarding tables are used to match and forward native packets received from a remote PE router 810-113 to local VPN sites via the access links 141-144, 151-154.

Table 1 is an example of a native VPN forwarding table at a PE router for an IP-VPN. In the terminology of IP-VPN, Table 1 is referred to as a Virtual Route Forwarder (VRF) for a VPN indicated by the value z.

TABLE 1

| VRF for VPN z | |
|---|---|
| IP Prefix | Next-hop |
| ... | ... |
| 10.10.10.0/24 | PE x |
| ... | ... |
| 116.11.0.0/16 | Access link y |
| ... | ... |

The PE router accesses the native VPN forwarding table (e.g., Table 1) in response to receiving an IPv4 packet for the VPN z from an access link. The IPv4 packet includes a destination address, e.g., the destination IP address of the packet is 10.10.10.5. The PE router looks up the destination IP address in the native VPN forwarding table based on longest-prefix-match (LPM) to make a forwarding decision. In this case, the lookup matches the prefix 10.10.10.0/24, which is in remote PE x. The PE router therefore sends the IPv4 packet to remote PE x. Similarly, if the PE router receives an IPv4 packet for VPN z from a remote PE router and the destination address in the packet as 116.11.12.1, the PE router looks up a corresponding entry in the native VPN forwarding table, 116.11.0.0/16, which results in the PE router forwarding the packet to the locally connected site of VPN z via access link y.

Some embodiments of the VPNs 820, 830 are Layer-2 VPNs such as BGP signaled multi-protocol label switching (MPLS) based Ethernet VPN (EVPN) and the PE routers 810-813 act as ethernet bridges for the VPN sites. The PE routers 810-813 learn the MAC addresses within a locally connected VPN site using MAC learning actions on the access links 841-844, 851-854. The learned MAC addresses are advertised by BGP in the context of the VPN-ID (Route Distinguisher) to all remote PE routers 810-813 and the VPN-Label is exchanged along with the MAC address advertisements. In case of EVPN, the VPN forwarding table at the PE routers 810-813 are MAC forwarding tables. In operation, an ingress PE router receives an Ethernet packet from a CE router in a VPN, looks up the destination MAC address of the ethernet packet in corresponding MAC forwarding table to retrieve the egress PE router that had advertised the MAC address. The ingress PE router then sends the ethernet packet to the egress PE router with the VPN-Label advertised by the egress PE router. Upon receipt of an ethernet packet with a VPN-Label, the egress PE router forwards the packet by looking up the destination MAC address of the packet in the MAC forwarding table.

In the illustrated embodiment, the PE routers 810-813 are not directly connected with each other, so the PE routers 810-813 tunnel the packets encapsulated by a VPN-Label between the PE routers 810-813 across the public network 805 using tunneling protocols such as MPLS based LSPs (Labelled Switched Paths), IP based tunneling methods such as GRE (Generic Routing Encapsulation), VXLAN (Virtual Extensible Local Area Network), MPLS over user datagram protocol (MPLSoUDP), and the like. The tunnels are sometimes referred as Packet Switched Network (PSN) tunnels. In the illustrated embodiment, the tunnels are implemented using MPLS LSPs as PSN Tunnels. The MPLS LSPs are established by LDP (Label Distribution Protocol), RSVP-TE (Resource Reservation Protocol-Traffic Engineering) or the tunnels are source routed stateless LSPs such as SR (Segment Routing), SR-TE (Segment Routing-Traffic Engineering), and the like. Packets from multiple VPNs can be multiplexed and sent on the same PSN tunnel between the PE routers 810-813 since the VPN-Label acts as a demultiplexer to distinguish packets for the VPNs.

In the illustrated embodiment, multiple VPNs 820, 830 span the same set of PE routers 810-813. However, in other embodiments, the VPNs 820, 830 only a subset of the PE routers 810-813 in common. Furthermore, embodiments of the PE routers 810-813 allocate a single VPN Label and advertise the label to all remote/ingress PE routers. Some embodiments of the PE routers are implemented as a mesh network such that the VPN site 820, 830 are interconnected by multiple PE routers in a multi-hop topology.

Figure 9:
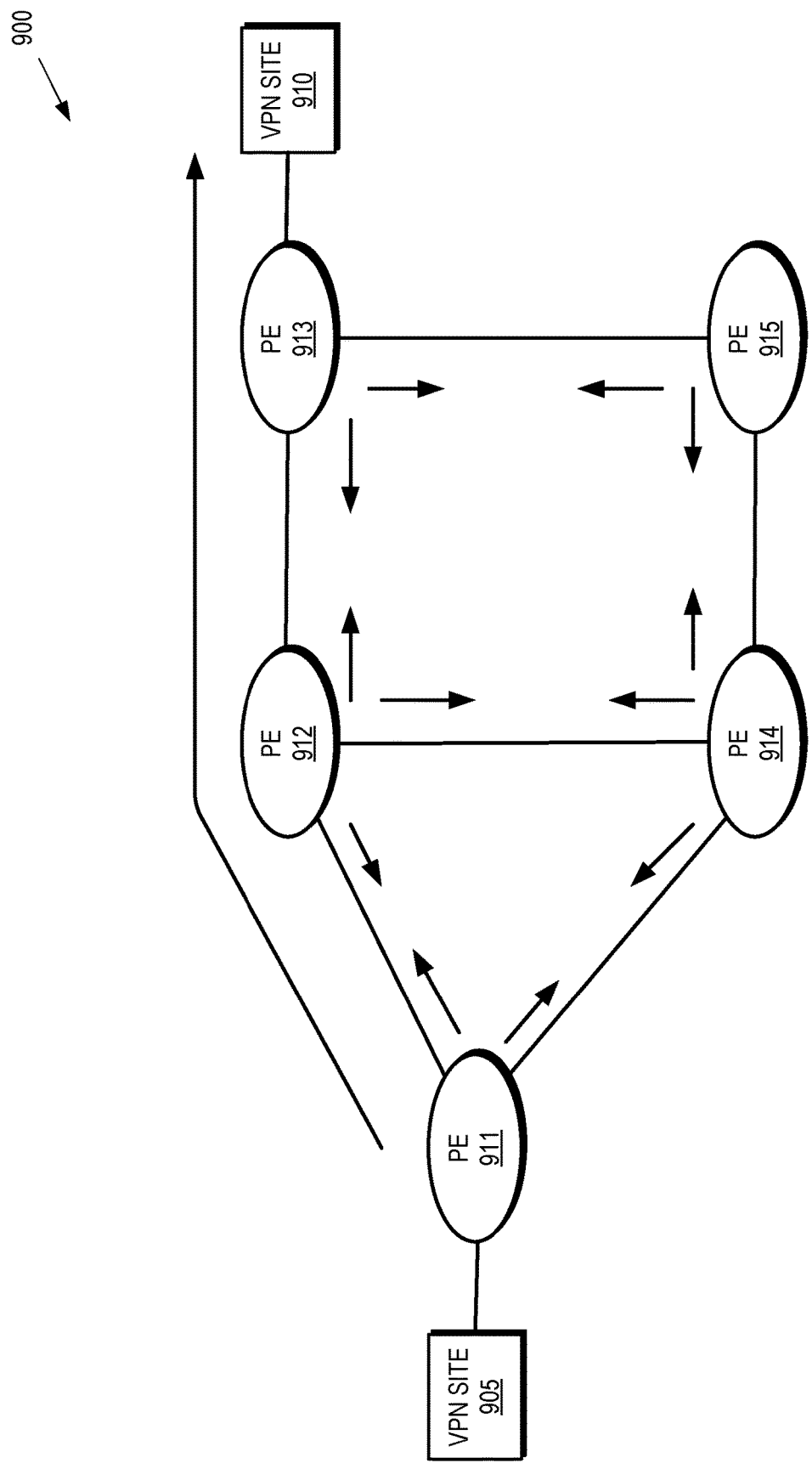
FIG. 9 is a block diagram of a communication system that implements an ethernet virtual private network (EVPN) according to some embodiments.

FIG. 9 is a block diagram of a communication system 900 that implements an ethernet virtual private network (EVPN) according to some embodiments. The communication system 900 includes two VPN sites 905, 910 such as the VPN sites 820-1, 820-3 shown in FIG. 8. The VPN sites 905, 910 are interconnected by a set of PE routers 911, 912, 913, 914, 915 (collectively referred to herein as "the PE routers 911-915") that function as ethernet bridges for the EVPN. The PE routers are not directly connected to each other, rather interconnected by a public network of P routers, which are not shown in FIG. 9 in the interest of clarity. In the illustrated embodiment, the PE routers 911-915 are implemented as a mesh network over a public network. The BGP protocol running on the PE routers 911-915 advertises the MAC addresses that have been learned from the VPN site 905, 910, as discussed herein. The BGP protocol also computes pathways through the mesh topology and supports multipath routing of ethernet packets, which leads to looping scenarios as in the SPB protocols discussed above with regard to FIG. 2.

In summary, the presence of loops is a problem in conventional ethernet bridging, SPB, and EVPN networks. The loop detection techniques implemented in conventional ethernet bridging shuts down a port in response to detecting a loop in a packet arriving at the port, which penalizes all the good (i.e., non-looping) packets that are also flowing through this port. Networks that implement SPB utilize several techniques for loop detection. However, these techniques are complex and work only in a few best-case topologies and non-critical failures, which makes them impractical to implement. Furthermore, loops caused by misbehavior at the ethernet bridges cannot be prevented using these techniques. The EVPN networks do not implement any loop detection schemes.

Adding a TTL or Hop Count extension header to ethernet headers can reduce, but not eliminate, the damage caused by looping packets. A looping packet may amplify traffic and consume bandwidth until the TTL expires or the packet escapes following MAC forwarding table convergence, which can transiently cause congestion even on a well provisioned link by increasing the traffic. Congestion reduces the bandwidth for other traffic (which would not have been affected otherwise) and causes delay and congestive packet loss on the links. The duration of the delay is determined by the duration of the loop. If the loop is a permanent one due to misbehavior of the ethernet bridges, then packets continue to loop until the TTL expires, which amplifies the bandwidth consumption by an amount determined by the number of loops before the TTL expires. If a loop consists of N routers and the TTL before the start of the loop is T, then a packet will make at least T/N loops before it gets dropped. Secondly, in the TTL expiry method, there is no meaningful way to report the set of ethernet bridges involved in the loop so that administrative actions can be taken; the first bridge that expires the TTL drops the packet and is agnostic of the nature of the loop.

Figure 10:
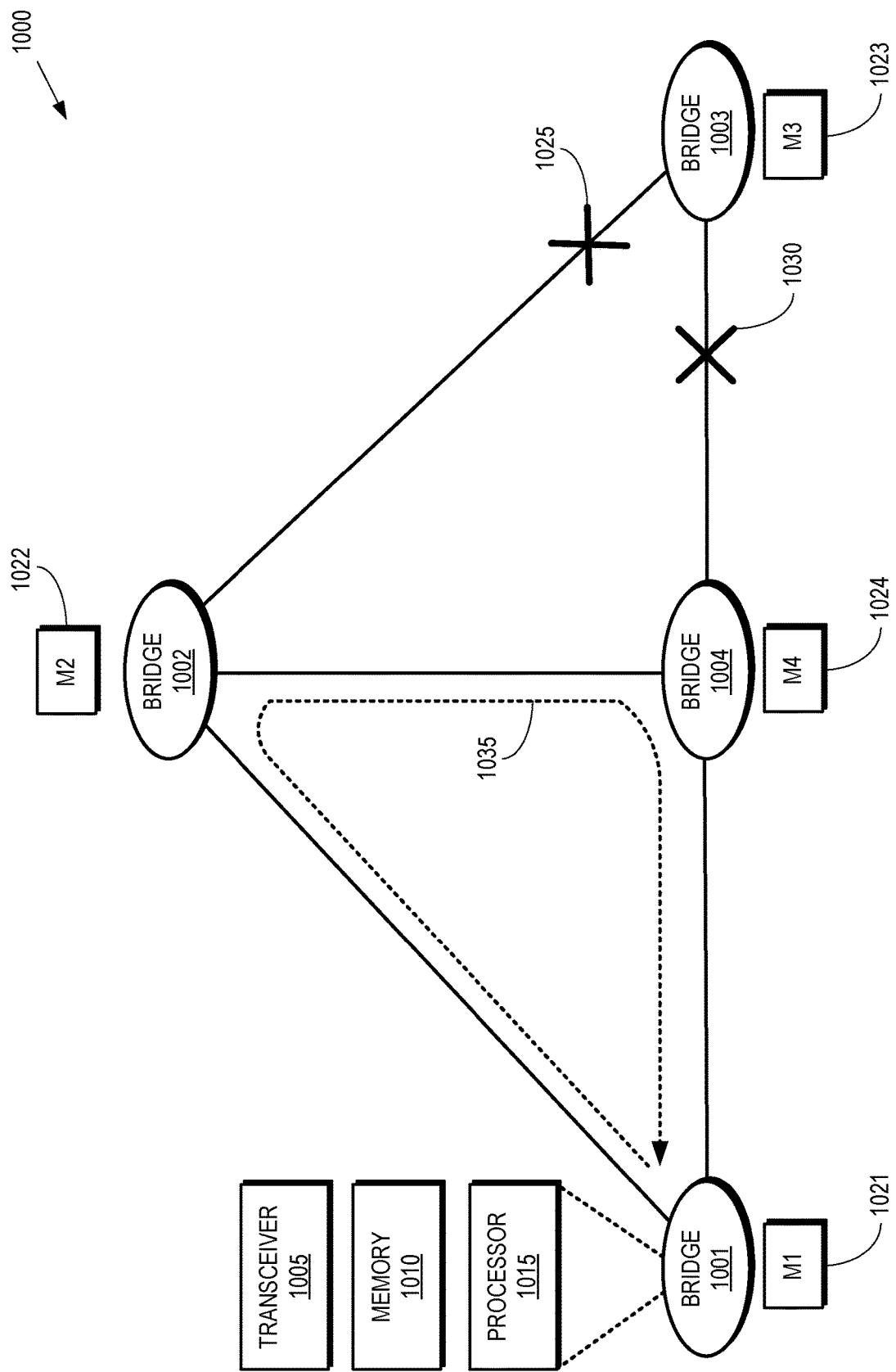
FIG. 10 is a block diagram of an ethernet network that implements loop detection based on a recorded route for ethernet (RRE) included in ethernet packets according to some embodiments.

FIG. 10 is a block diagram of an ethernet network 1000 that implements loop detection based on a recorded route for ethernet (RRE) included in ethernet packets according to some embodiments. The ethernet network 1000 includes ethernet bridges 1001, 1002, 1003, 1004, which are collectively referred to herein as "the ethernet bridges 1001-1004." The ethernet bridges may be traditional ethernet bridges or bridges in SPB network or EVPN instances in PE routers or the like. In the illustrated embodiment, the ethernet bridges 1001-1004 are implemented using a transceiver 1005 to transmit and receive ethernet packets that are conveyed through the network, a memory 1010 to store data and instructions, and a processor 1015 to execute the instructions, e.g., by performing operations indicated by the instructions stored in the memory 1010 on the data stored in the memory 1010 and storing the results in the memory 1010.

The ethernet bridges 1001-1004 are configured with a network wide unique bridge identifier to uniquely identify the ethernet bridges 1001-1004 in the network. Some embodiments of the ethernet bridges 1001-1004 configure a local MAC address, which is used as the bridge identifier. The ethernet bridges 1001-1004 are therefore uniquely identified within the ethernet network 1000 by the MAC addresses 1021-1024, which are also represented as M1-M4 in FIG. 10. A list of bridge identifiers of the ethernet bridges 1001-1004 along a path traversed by an ethernet packet is referred to herein as a "Recorded Route for Ethernet (RRE)." The list describes the set of bridges traversed along a path in their order of occurrence in the path. For example, the RRE for the path that connects the ethernet bridges 1001, 1002, 1003 is {M3, M2, M1}. The bridge identifiers are pushed in reversed order and the RRE is appended to the ethernet header for which loop detection is being performed.

Some embodiments of the ethernet bridges 1001-1004 are assigned a VLAN Identifier (VID) as their unique network-wide identifier. The VID space used for the bridge identifiers is orthogonal to the VIDs used for VLAN based partitioning of network segments, as the former is not encoded into the packet as VLAN tag, rather encoded within RRE. The VID space used to allocate network-wide unique bridge identifiers is referred to herein as the "bridge identifier VID space (Br-VID space)" and a VID allocated from this space is referred herein as the "bridge identifier VID" (Br-VID). Identifying the ethernet bridges 1001-104 using the VID as bridge identifier enables compact encoding of the RRE since size of a VID is 12 bits as opposed to 6-octets of a MAC address. However, Br-VID based scheme requires centralized management of the Br-VID space and explicit configuration of Br-VIDs into the ethernet bridges 1000-1004 as identifiers.

The ethernet bridges 1001-1004 perform loop detection based on the RRE included in ethernet packets transmitted and received by the ethernet bridges 1001-1004. An ethernet bridge 1001-1004 that intends to enable loop detection on an ethernet packet appends an RRE after the ethernet header processed by the ethernet bridge 1001-1004. The ethernet bridge 1001-1004 encodes its own bridge identifier in the RRE, which is initially the only bridge identifier in the RRE. In response to receiving an ethernet packet, the ethernet bridges 1001-1004 inspect the ethernet packet to determine whether an RRE is appended to the ethernet header. If an RRE is found, then the ethernet bridge 1001-1004 performs the following actions:

Scans the bridge identifiers in RRE to check for the presence of its own bridge identifier.

If its own bridge identifier is found in the RRE, it means the packet has traversed this bridge before and there is a loop somewhere in the network. Following actions are taken.

Drops the packet.

Optionally, generates a loop detection notification to a reporting entity with a copy of the dropped ethernet packet. In the notified copy of the packet, the bridge identifier of the ethernet bridge 1001-1004 is pushed onto RRE. From the notified packet, the reporting entity can figure out the ethernet bridges 1001-1004 along the looped path by tracing back the bridge identifiers in the RRE till the recurrence of the topmost bridge identifier.

If its own bridge identifier is not found in the RRE, then it makes a forwarding decision based on the ethernet header.

If the destination MAC address in ethernet header indicates it as the egress router, then pops the RRE, and makes further forwarding decision based on the context associated with the packet.

If the destination MAC address indicates that the packet is to be forwarded, then
    if the next-hop link is enabled for loop detection then pushes its own bridge identifier onto the RRE, else removes the RRE.
    Forwards the packet to its designated ports(s) based on MAC forwarding table.

In the illustrated embodiment, a bridge does not push an RRE when a packet is forwarded normally along the primary path connecting the ethernet bridges 1001-1003. The RRE is pushed only by an ethernet bridge that fast-reroutes a packet (if it does not contain an RRE already). For example, links to the bridge 1003 have failed, as indicated by the crosses 1025, 1030. The ethernet bridge 1001 transmits a packet to the ethernet bridge 1002, which makes a forwarding decision to the ethernet bridge 1003 in response to receiving the ethernet packet. Due to the link failure indicated by the cross 1025, the ethernet bridge 1002 fast-reroutes the packet via backup link to the ethernet bridge 1004. The ethernet bridge 1002 appends the RRE after the ethernet header and encodes its bridge identifier M2 into RRE. The resultant packet with RRE={M2} is sent to the ethernet bridge 1004.

On receiving the packet, the ethernet bridge 1004 finds an RRE after the ethernet header and scans the RRE to look for its own bridge identifier M4. Since M4 is not found in the RRE, the ethernet bridge 1004 makes a forwarding decision to the ethernet bridge 1003. Due to the link failure indicated by the cross 1030, the ethernet bridge 1004 fast-reroutes the ethernet packet via the backup link to the ethernet bridge 1001. The ethernet bridge 1004 pushes its own bridge identifier M4 onto the RRE. The ethernet bridge 1004 sends the packet to the ethernet bridge 1001 with RRE={M3, M2}.

On receiving the packet, the ethernet bridge 1001 finds an RRE after the ethernet header and so scans the RRE to look for its own bridge identifier M1. Since M1 is not found in RRE, it makes a forwarding decision to the ethernet bridge 1002. The ethernet bridge 1001 pushes its bridge identifier M1 onto RRE. The packet is sent to the ethernet bridge 1002 with RRE={M1, M3, M2}.

On receiving the packet, the ethernet bridge 1002 finds the RRE after the ethernet header and so scans the RRE to look for its bridge identifier M2. Since M2 is found in the RRE, the ethernet bridge 1002 detects a loop 1035 and drops the packet. If a reporting entity is configured in the network, then the ethernet bridge 1002 generates a loop detection notification to the reporting entity. In the notification, the ethernet bridge 1002 includes the copy of the packet. In the copy, the ethernet bridge 1002 pushes its bridge identifier M2 onto the RRE. Consequently, the reporting entity receives the packet with RRE={M2, M1, M3, M2}. The entity traces back the RRE to identify the recurrence of the topmost bridge identifier M2 and determines the loop as M2→M3→M1→M2.

Although the ethernet network 1000 shown in FIG. 10 enables loop detection in response to fast re-routing by one of the ethernet bridges 1001-1004, some embodiments of the ethernet network 1000 enable loop detection in the network by default. For example, if the operator of the network intends to protect against loops created by misbehavior of one of the ethernet bridges 1001-1004, inconsistency in MAC forwarding tables in ethernet bridges 1001-1004 during convergence of the SPB network or the EVPN network then the ingress bridge always pushes an RRE onto each packet. As a result, each subsequent ethernet bridge 1001-1004 along the path of the packet scans the RRE to check for loop, and if no loop is found then pushes its own bridge identifier onto the RRE before forwarding the packet. Apart from loop detection, the RRE can be used by a receiving bridge of a packet to also determine the path traversed by the packet for various purposes.

Including the RRE in ethernet packets does not incur a large overhead cost. For example, if the maximum number of bridges traversed by any ethernet packet is ten, the maximum overhead of RRE on an ethernet packet that uses MAC address as bridge identifier would be around 10×6B=60B when the packet reaches the last bridge (as RRE grows linearly along each hop in the path). If the Br-VID is used as bridge identifier, then maximum overhead of RRE would be 10×2B=20B which is 67% reduction from the size when bridge identifier is encoded as MAC address. If the overhead is tolerable, an operator may choose to enable loop detection in the network by default so that ingress bridges always append an RRE after the ethernet header of packets. Otherwise, the operator may choose to selectively enable loop detection, such as during FRR or other network convergence scenarios. If loop detection is not enabled by default, then it is also possible that the operator of the ethernet network 1000 can administratively inject a test packet at the ingress ethernet bridge 1001 or in any intermediate bridge, such that the packet includes the RRE. Then if a loop is detected on the test packet by one of the ethernet bridges 1001-1004, it may generate a loop detection notification with the details on the looping path. Such test packets could be OAM packets such as CFM packets to verify connectivity along a path.

Figure 11:
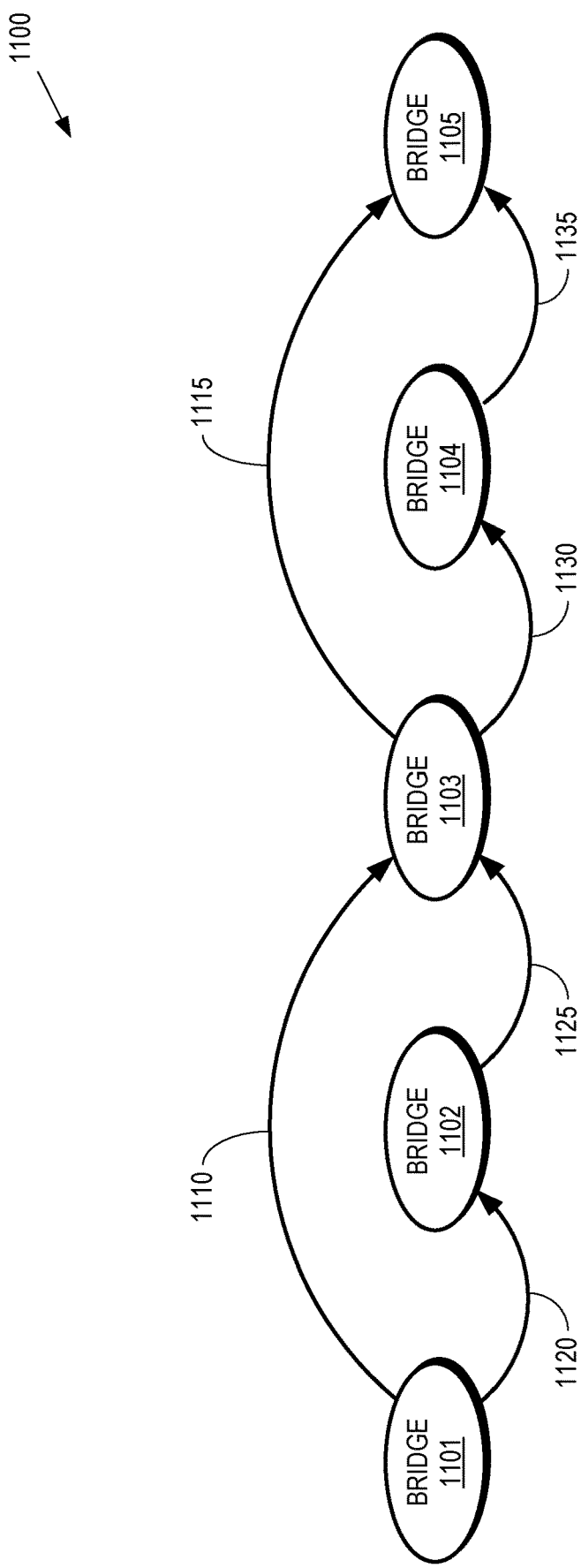
FIG. 11 is a block diagram of a communication system that includes a set of ethernet bridges that form a nested ethernet network according to some embodiments.

FIG. 11 is a block diagram of a communication system 1100 that includes a set of ethernet bridges that form a nested ethernet network according to some embodiments. One example of a nested ethernet network is a provider backbone bridge (PBB). Ethernet packets that traverse a PBB network included to ethernet headers that are referred to as MAC-in-MAC headers. The outer ethernet header (the backbone header) belongs to the provider of the backbone bridging domain. The inner ethernet header (customer header) belongs to a customer bridging domain. The levels corresponding to the backbone bridging domain and the customer bridging domain enable and perform loop detection independently. Ethernet bridges in the backbone and customer domains push or process RREs appended to the ethernet header at the corresponding level. For example, an ethernet bridge in the backbone bridging domain pushes or processes RREs appended to the outer ethernet header and an ethernet bridge in the customer bridging domain pushes or processes RREs appended to the inner ethernet header.

In the illustrated embodiment, the communication system 1100 includes ethernet bridges 1101, 1102, 1103, 1104, 1105 that are collectively referred to herein as "the ethernet bridges 1101-1105." The ethernet bridges 1101-1105 form two levels of a hierarchy of nested ethernet networks. The first, higher level is a customer bridging domain that supports a path including a portion 1110 between the ethernet bridge 1101 and the ethernet bridge 1103 and a portion 1115 between the ethernet bridge 1103 and the ethernet bridge 1105. The second, lower, level includes a first backbone bridging domain that supports a path between the ethernet bridges 1101-1103 and a second backbone bridging domain that supports a path between the ethernet bridges 1103-1105.

In the customer bridging domain, the ethernet bridge 1101 sends a packet to the ethernet bridge 1103 with a customer header. The ethernet bridge 1103 looks up the destination MAC address of the customer header in the customers MAC forwarding table and, based on the lookup, forward the packet to the ethernet bridge 1105. Bridges in the customer domain are not directly connected so the customer packet is overlaid on a provider domain to reach a next bridge. In the illustrated embodiment, the customer bridging domain between the ethernet bridges 1101, 1103 is overlaid on the first backbone bridging domain including the ethernet bridges 1101-1103. The customer bridging domain between the ethernet bridges 1103, 1105 is overlaid on the second backbone bridging domain including the ethernet bridges 1103-1105. The ethernet bridge 1101 therefore pushes a backbone header onto the packet with the destination MAC address of the ethernet bridge 1103. The headers in the packet therefore include {backbone header, customer header}. The packet is then processed along the path including the ethernet bridges 1101-1103 based on the backbone header and the backbone or provider MAC forwarding table. The ethernet bridge 1103 pops the backbone header based on the destination MAC address in the backbone header. The ethernet bridge 1103 that makes the forwarding decision for the packet based on the customer header and the customers MAC forwarding table. In the illustrated embodiment, the ethernet bridge 1103 forwards the packet to the ethernet bridge 1105. Again, since the ethernet bridge 1105 is not directly connected to the ethernet bridge 1103 in the customer bridging domain, the ethernet bridge 1103 pushes a backbone header onto the packet with a destination MAC address of the ethernet bridge 1105. The packet is then forwarded in the second backbone bridging domain as discussed herein.

To implement loop detection in the customer bridging domain and the backbone bridging domains, the ethernet bridges 1101-1103 are assigned unique network identifiers M1-M5, as discussed herein. The ethernet bridge 1101 appends an RRE-2={M1} after the customer header. Then the ethernet bridge 1101 pushes the backbone header (with destination MAC of the ethernet bridge 1103) and appends RRE-11={M1} after the backbone header. The headers in the resultant packet would be: {backbone header, RRE-11, customer header, RRE-2}, which is sent to the ethernet bridge 1102, which checks for a loop in RRE-11, pushes its bridge identifier M2 into RRE-11, and transmits the resultant packet with headers {backbone header, RRE-11={M2, M1}, customer header, RRE-2={M1}} to the ethernet bridge 1103. The ethernet bridge 1103 checks for loop in RRE-11 and pops backbone header and RRE-11 since the ethernet bridge 1103 is the termination point of the first backbone bridging domain. The ethernet bridge 1103 then finds the RRE-2, checks for loop, and inserts its bridge identifier M3 into RRE-2. The resultant packet {customer header, RRE-2={M3, M1}} is sent over the second backbone bridging domain. The ethernet bridge 1103 pushes the backbone header to the ethernet bridge 1105 and then appends RRE-12={M3} after the backbone header. The resultant packet with headers {backbone header, RRE-12={M3}, customer header, RRE-2={M3, M1}} is sent to the ethernet bridge 1104. The packet is then forwarded to the ethernet bridge 1105 following the above procedure.

Figure 12:
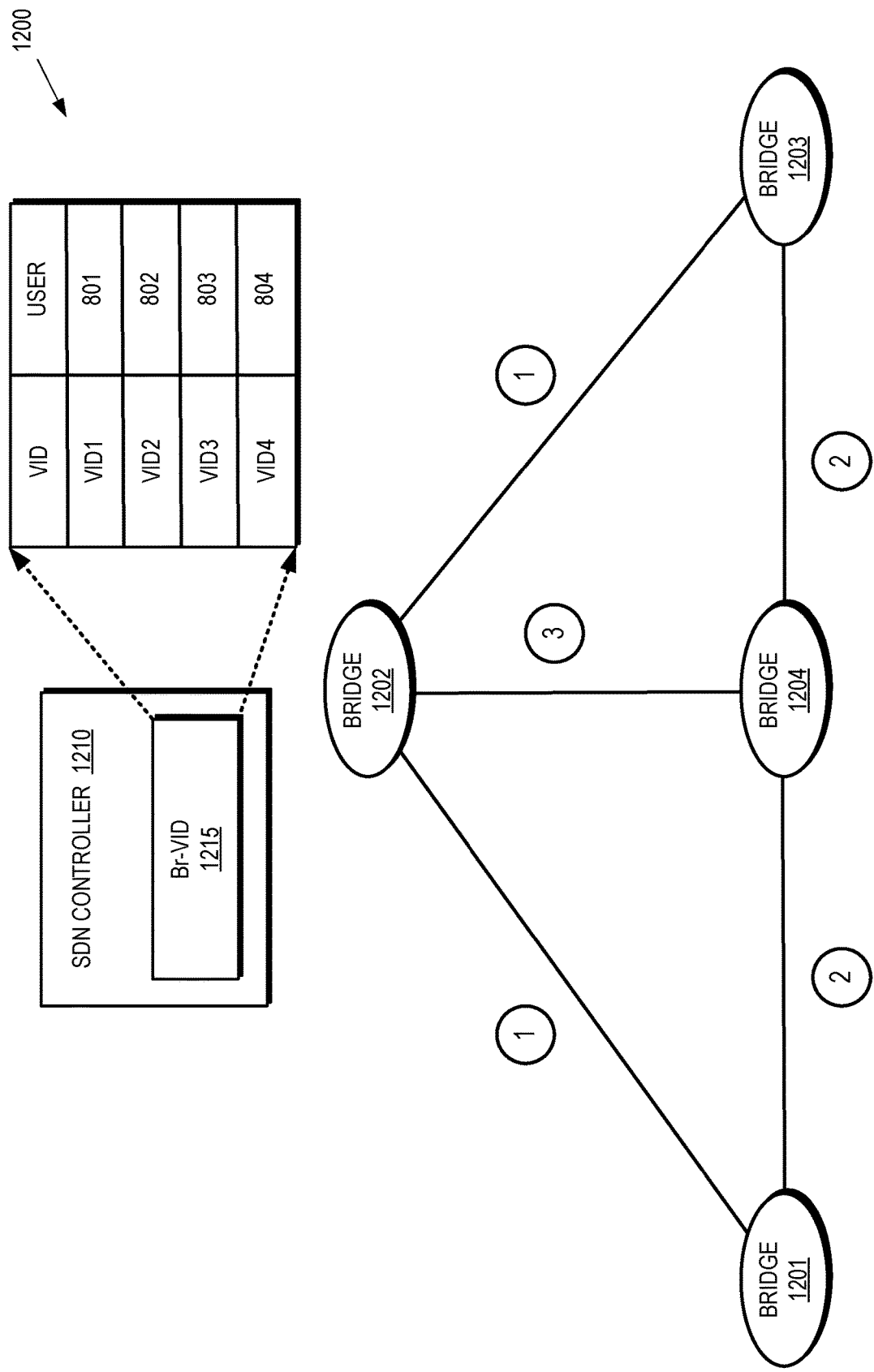
FIG. 12 is a block diagram of a communication system that assigns unique identifiers to bridges from a virtual local area network (VLAN) identifier (VID) space according to some embodiments.

FIG. 12 is a block diagram of a communication system 1200 that assigns unique identifiers to routers from a Br-VID space according to some embodiments. The communication system 1200 includes ethernet bridges 1201, 1202, 1203, 1204, which are collectively referred to herein as "the ethernet bridges 1201-1204." In the illustrated embodiment, the ethernet bridge 1201 is an ingress ethernet bridge that is connected to a source and the ethernet bridge 1203 is an egress ethernet bridge that is connected to a destination. The metrics or costs of the links are indicated in the circled numerals. For example, the cost of the link between the ethernet bridge 1201 and the ethernet bridge 1200 and to is one and the cost of the link between the ethernet bridge 1202 and the ethernet bridge 1204 is three.

The communication system 1200 includes a centralized software defined networking (SDN) controller 1210 that oversees the communication system 1200. The SDN controller 1210 includes (or has access to) a Br-VID space 1215 that is implemented using memory internal to SDN controller 1210 or external to the SDN controller 1210. In some embodiments, the Br-VID space 1215 is hosted by a centralized network management server (NMS), a path computation element (PCE) server, and the like. The SDN controller 1210 assigns or allocates network-wide unique identifiers (Br-VID) to the ethernet bridges 1201-1204. The assignments or allocations are stored in the Br-VID space 1215. A first column in the Br-VID space 1215 indicates values of the Br-VIDs and a second column in the Br-VID space 1215 indicates the user that has been assigned or allocated the label. For example, VID1 is assigned to the ethernet bridge 1201, the VID2 is assigned to the ethernet bridge 1202, VID3 is assigned to the ethernet bridge 1203, and VID4 is assigned to the ethernet bridge 1204. Assigning or allocating the Br-VID to the ethernet bridges 1201-1204 includes providing the Br-VIDs from the SDN controller 1210 to the corresponding ethernet bridges 1201-1204.

In the illustrated embodiment, the Br-VID space 1215 used for the bridge identifier does not collide with VIDs used for VLAN based partitioning of network segments, as the former is not encoded into the packet as VLAN tag, rather encoded within RRE. Using the VID as bridge identifier provides more compact encoding of RRE since size of a VID is 12 bits. In the RRE, each Br-VID padded with 4-bits so that Br-VID always maintains byte wise alignment. Size of Br-VID plus padding is 2B. For example, if a maximum number of hops a packet would traverse in an ethernet network is 10 hops, then a maximum size of RRE would be 10×2B=20B which is 67% reduction from the size when bridge identifier is encoded as MAC address (size of MAC address is 6B). However, Br-VID based encoding imposes maximum number of bridges in the network to 4095, which is much higher than practical sizes of networks.

Figure 13:
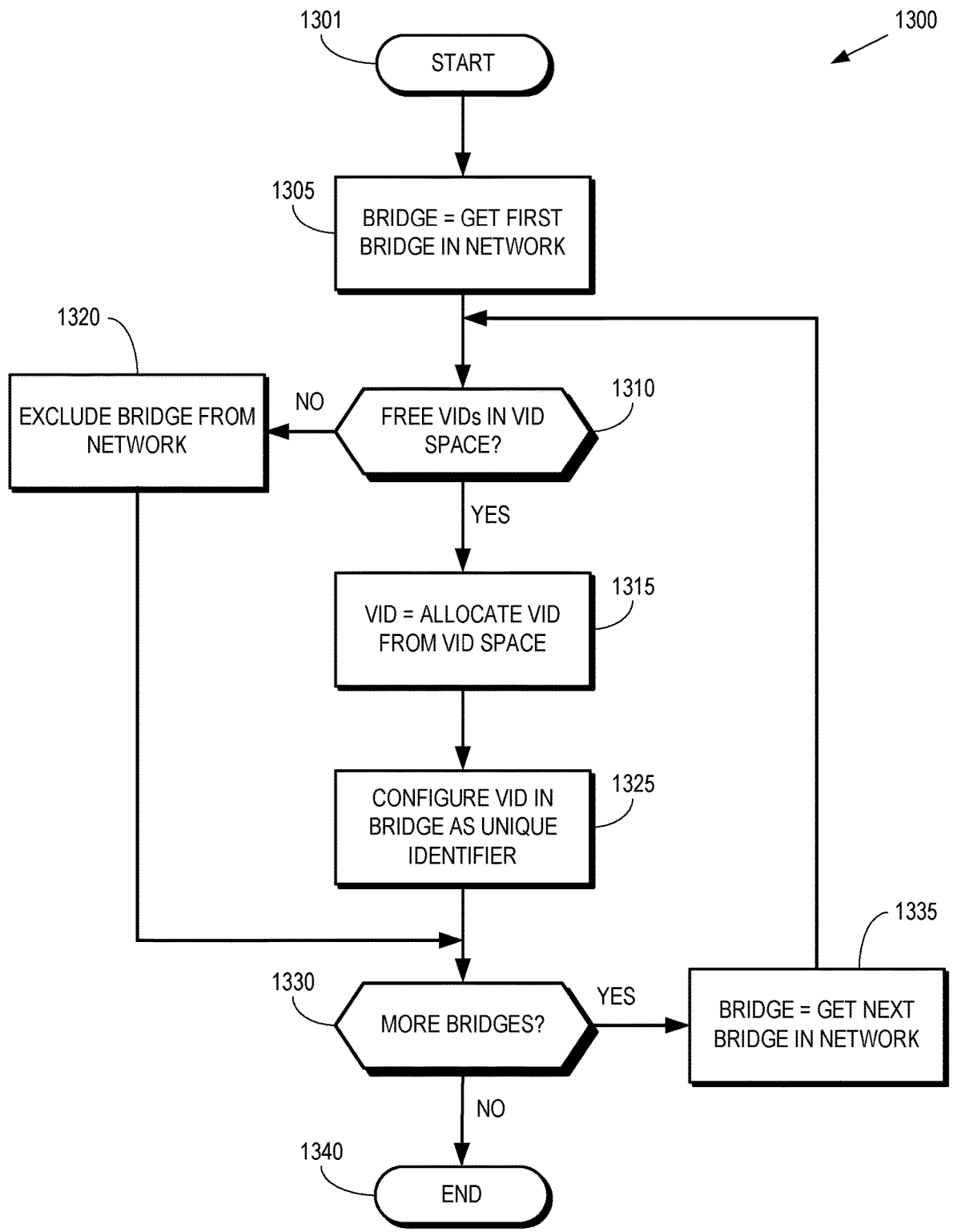
FIG. 13 is a flow diagram of a method of configuring VLAN identifiers that are allocated from a VID space according to some embodiments.

FIG. 13 is a flow diagram of a method 1300 of configuring Br-VIDs that are allocated from a Br-VID space according to some embodiments. The method 1300 is implemented in some embodiments of the communication system 1000 shown in FIG. 10, the communication system 1100 shown in FIG. 11, and the communication system 1200 shown in FIG. 12. Some embodiments of the method 1300 are implemented in a controller such as the SDN controller 1210 shown in FIG. 12.

The method 1300 begins at the block 1301. At the block 1305, the controller retrieves the identity of the first ethernet bridge. At decision block 1310, the controller determines whether the Br-VID space includes one or more free Br-VIDs, e.g., Br-VIDs that are unallocated or unassigned in any context. If the Br-VID space includes at least one free Br-VID, the method 1300 flows to block 1315. If the Br-VID space does not include any free Br-VIDs because the Br-VIDs have all been assigned to other routers, the method 1300 flows to block 1320.

At block 1315, the controller allocates (or assigns) a Br-VID from the Br-VID space to the current ethernet bridge. At block 1325, the controller transmits one or more messages to the current ethernet bridge including information that the current ethernet bridge uses to configure the Br-VID as its Br-VID. In response to receiving the message, the current ethernet bridge configures itself to use the received Br-VID, e.g., by storing the Br-VID in a local memory or database. The method 1300 then flows to decision block 1330.

At block 1320, the controller excludes the ethernet bridge from the network due to the exhaustion of Br-VID in the Br-VID space because assigning a previously assigned Br-VID to the current ethernet bridge would result in a non-unique Br-VID for the ethernet bridges that share the Br-VID. The method 1300 then flows to decision block 1330.

At decision block 1330, the controller determines whether there are more ethernet bridges that need to be allocated or assigned Br-VID. If so, the method 1300 flows to block 1335 and the controller retrieves the identity of another ethernet bridge, which becomes the current ethernet bridge for the controller. The method 1300 then flows to decision block 1310. If there are no more ethernet bridges that require allocation or assignment of Br-VID in the network, the method 1300 flows to block 1340 and the method 1300 ends.

Figure 14:
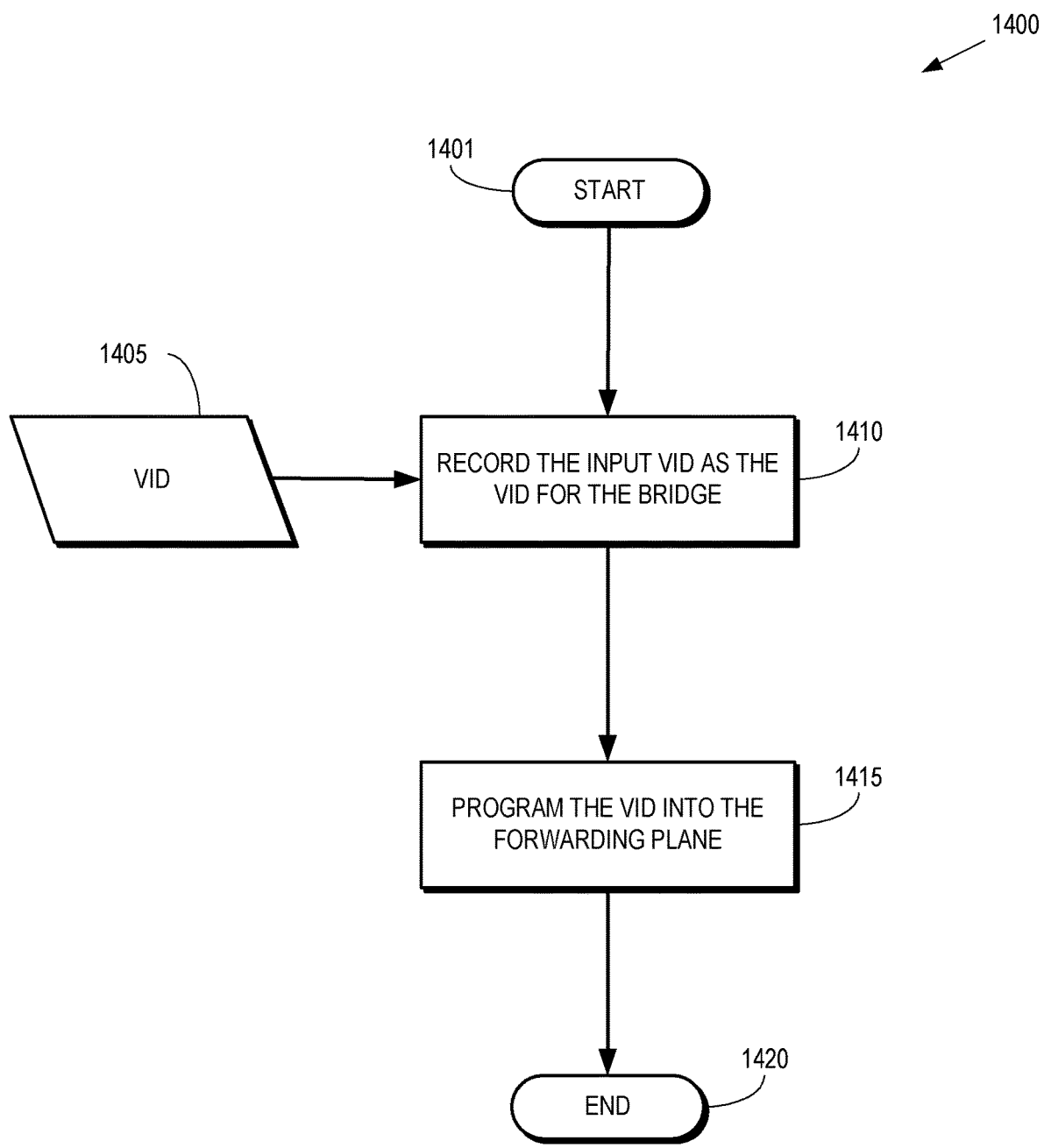
FIG. 14 is a flow diagram of a method of configuring an ethernet bridge with a VID provided by a controller according to some embodiments.

FIG. 14 is a flow diagram of a method 1400 of configuring an ethernet bridge with a Br-VID provided by a controller according to some embodiments. The method 1400 is implemented in some embodiments of the communication system 1000 shown in FIG. 10, the communication system 1100 shown in FIG. 11, and the communication system 1200 shown in FIG. 12.

The method 1400 begins at block 1401. At the input block 1405, the ethernet bridge receives the Br-VID provided by the controller. At block 1410, the ethernet bridge records the input Br-VID as the network-wide unique identifier assigned to the ethernet bridge. In some embodiments, the ethernet bridge stores the Br-VID in a memory or database implemented in the ethernet bridge. At block 1415, the ethernet bridge programs the Br-VID into the forwarding plane so that the forwarding plane refers to the Br-VID when originating an RRE (e.g., when the ethernet bridge is an ingress ethernet bridge for an ethernet packet) or processing received packets that include an RRE. The method 1400 ends at block 1420.

FIG. 15 illustrates a format of an RRE 1500 according to some embodiments. The fields in the RRE 1500 are as follows:
Tag Protocol Identifier (TPID): A 16-bit field set to a value to identify the packet carried as RRE 1500. This field is located at the same position as the EtherType field in untagged frames and is thus used to distinguish the frame from untagged frames.
0xB000: This value indicates that bridge identifiers are encoded as MAC addresses.
0xB001: This value indicates that bridge identifiers are encoded as Br-VIDs.
An implementation may also reserve alternate values.
Flags: A 4-bit that defines various flags for operations on RRE 1500. Currently no flags are defined, so originator should set the field to 0 and a receiver should ignore the field.
Length: 12-bit length field indicates the length of the list of bridge identifiers, in units of octets.
Bridge Identifier 1 to N: The list of bridge identifiers. TPID is 0xB000 then a bridge identifier is encoded as 6-octet MAC address. If TPID ix 0xB001 then a bridge identifier is encoded as a 12-bit Br-VID.
Padding: The list of bridge identifiers must be 32-bt aligned. If not 32-bit aligned, then padding is added after list of bridge identifiers to make the list 32-bit aligned.

FIG. 16 illustrates a MAC address used as a bridge identifier 1600 according to some embodiments. In the illustrated embodiment, the list of bridge identifiers is used when the TPID is 0xB000. Each bridge identifier is a 6-octet MAC address.

FIG. 17 illustrates a list 1700 of bridge identifiers when TPID is 0xB001 according to some embodiments. Each bridge identifier is a 2-octets unit with the following fields:
Rsvd: 4-bit field reserved for future use. Sender must set this field to 0 and receiver must ignore this field.
VID: 12-bit field that encodes the VID that identifies the bridge.

Figure 18:
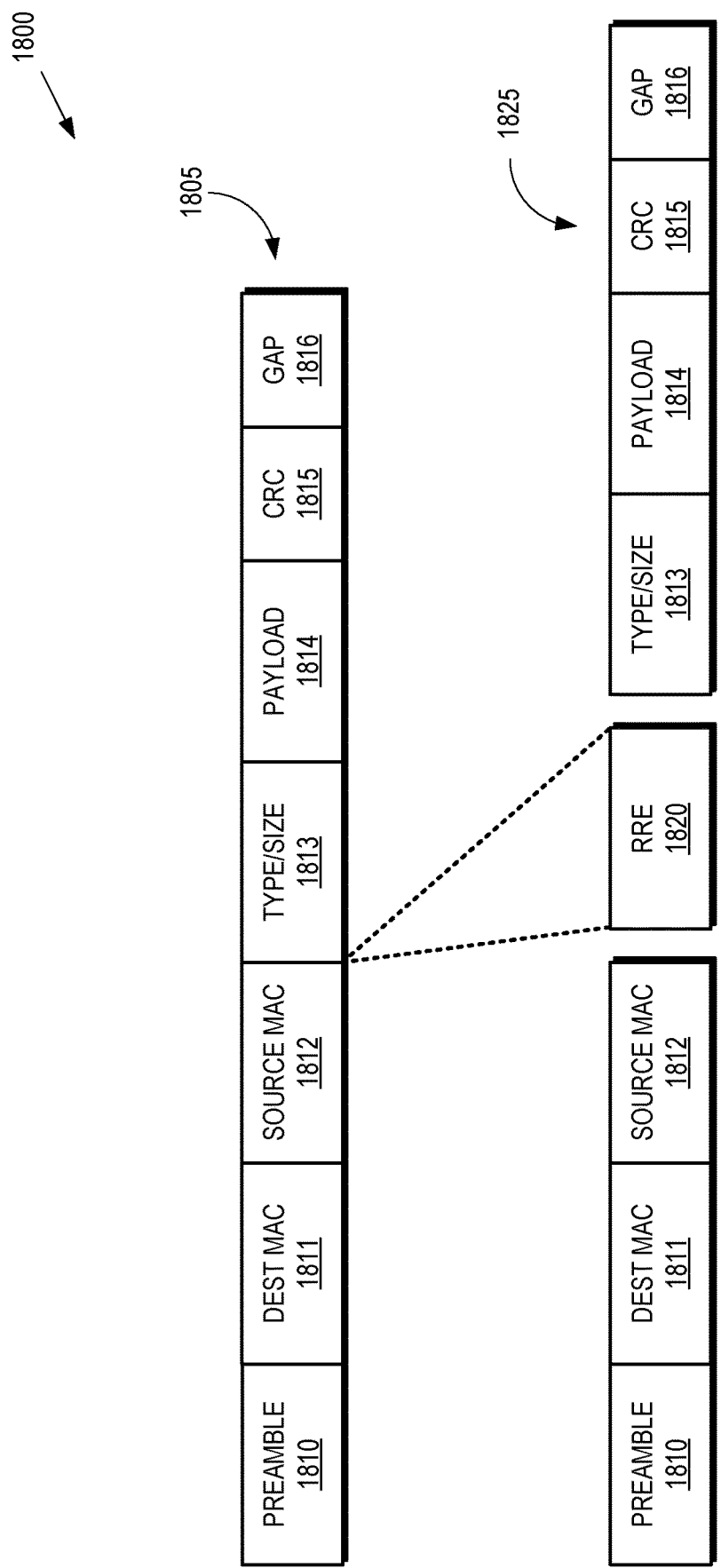
FIG. 18 is a block diagram illustrating a process of addition of an RRE to an ethernet header according to some embodiments.

FIG. 18 is a block diagram illustrating a process 1800 of addition of an RRE to an ethernet header according to some embodiments. Adding the RRE to the ethernet header is performed by some embodiments of the communication system 1000 shown in FIG. 10, the communication system 1100 shown in FIG. 11, and the communication system 1200 shown in FIG. 12. In the illustrated embodiment, the packet including the ethernet header is in untagged packet.

Initially, an ethernet header 1805 includes a preamble 1810, a destination MAC address 1811, a source MAC address 1812, an Ethertype or size indicator 1813, a payload 1814, a cyclic redundancy check (CRC) 1815, and an interframe gap 1816. An RRE 1820 is then added to the ethernet header 1805 to form the ethernet header 1825. In the illustrated embodiment, the RRE 1820 is inserted between the source MAC address 1812 and the Ethertype/size indicator 1813, although other locations for the RRE 1820 are used in other embodiments.

Figure 19:
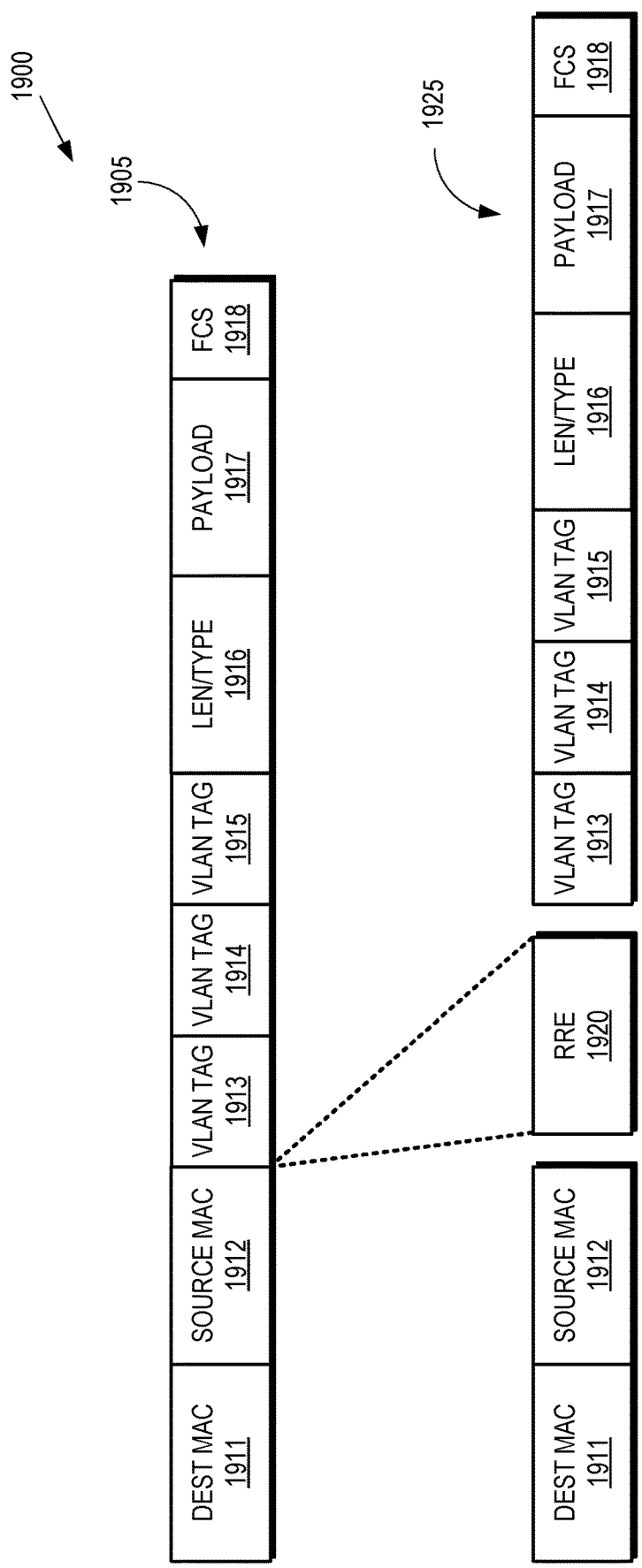
FIG. 19 is a block diagram illustrating a process of addition of an RRE to an ethernet header in a tagged packet according to some embodiments.

FIG. 19 is a block diagram illustrating a process 1900 of addition of an RRE to an ethernet header in a tagged packet according to some embodiments. Adding the RRE to the ethernet header is performed by some embodiments of the communication system 1000 shown in FIG. 10, the communication system 1100 shown in FIG. 11, and the communication system 1200 shown in FIG. 12.

Initially, an ethernet header 1905 includes a destination MAC address 1911, a source MAC address 1912, VLAN tags 1913-1915, a length or Ethertype indicator 1916, a payload 1917, and an FCS field 1918. The number of VLAN tags included in the ethernet header 1905 varies in different embodiments. An RRE 1920 is then added to the ethernet header 1905 to form the ethernet header 1925. In the illustrated embodiment, the RRE 1920 is inserted between the source MAC address 1912 and the VLAN tag 1913, although other locations for the RRE 1920 are used in other embodiments.

If any other ethernet layer specific headers were present after the ethernet header then those headers are appended to the RRE 1920. For example, the VLAN stack 1913-1915 is positioned after the RRE 1920. Since the TPID in the RRE 1920 takes the position of EtherType then, based on the TPID in RRE 1920, an ethernet bridge that is processing the packet figures out that the next header is RRE 1920. The ethernet bridge looks for the EtherType field at the end of RRE 1920. Since VLAN Type in VLAN header takes the position of Ethertype then, based on the VLAN type, the ethernet bridge figures out that a VLAN header is present. So, if RRE 1920 is present, then the ethernet bridge that is processing the ethernet packet 1925 looks at Ethertype field after the RRE 1920 to determine if other ethernet specific headers are present.

Figure 20:
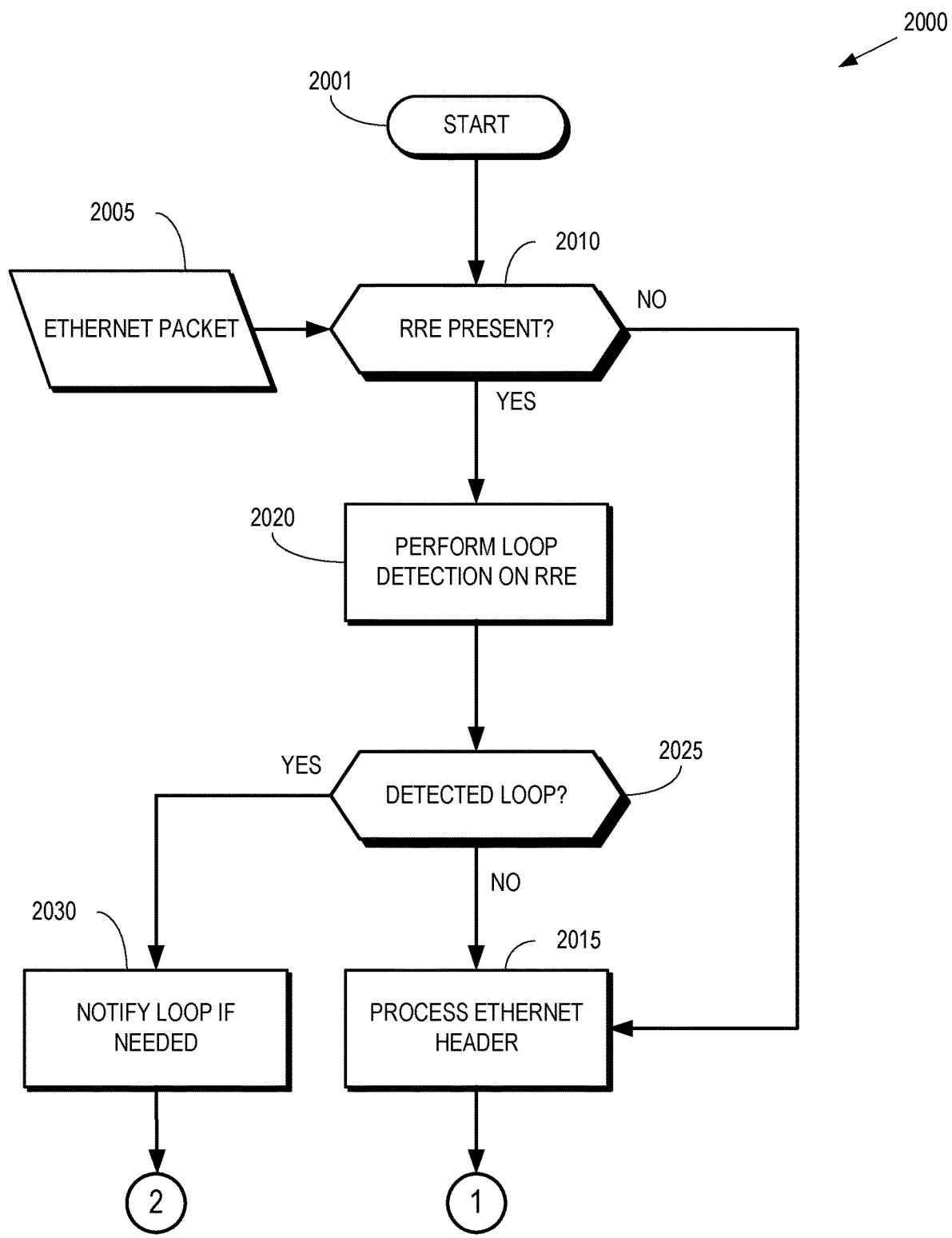
FIG. 20 is a flow diagram of a first portion of a method of processing an ethernet packet at an ethernet bridge according to some embodiments.

FIG. 20 is a flow diagram of a first portion of a method 2000 of processing an ethernet packet at an ethernet bridge according to some embodiments. The method 2000 is implemented by the ethernet bridges in some embodiments of the communication system 1000 shown in FIG. 10, the communication system 1100 shown in FIG. 11, and the communication system 1200 shown in FIG. 12.

The method 2000 begins at block 2001. At the input block 2005, the ethernet bridge receives an ethernet packet.

At decision block 2010, the router determines whether an RRE is present in the ethernet packet. If not, the method 2000 flows to block 2015. If the ethernet bridge detects an RRE in the packet, the method 2000 flows to block 2020.

At block 2015, the ethernet bridge processes the ethernet packet. In some embodiments, the ethernet bridge performs processing operations including learning the source MAC address (if required), evaluating other ethernet related headers (e.g., VLAN tags, etc.), and looking up the destination MAC address in the appropriate MAC forwarding table at the ethernet bridge. The method 2000 then flows to the node 1.

At block 2020, the router performs loop detection on the RRE, as discussed herein. At decision block 2025, the ethernet bridge determines whether a loop is detected. If so, the method 2000 flows to the block 2030 and the ethernet bridge (optionally) transmits a loop detection notification, as discussed herein. If the ethernet bridge is to transmit a loop detection notification, the ethernet bridge generates the loop detection notification. The method 2000 then flows to the node 2. If no loop is detected, the method 2000 flows to the block 2015.

Figure 21:
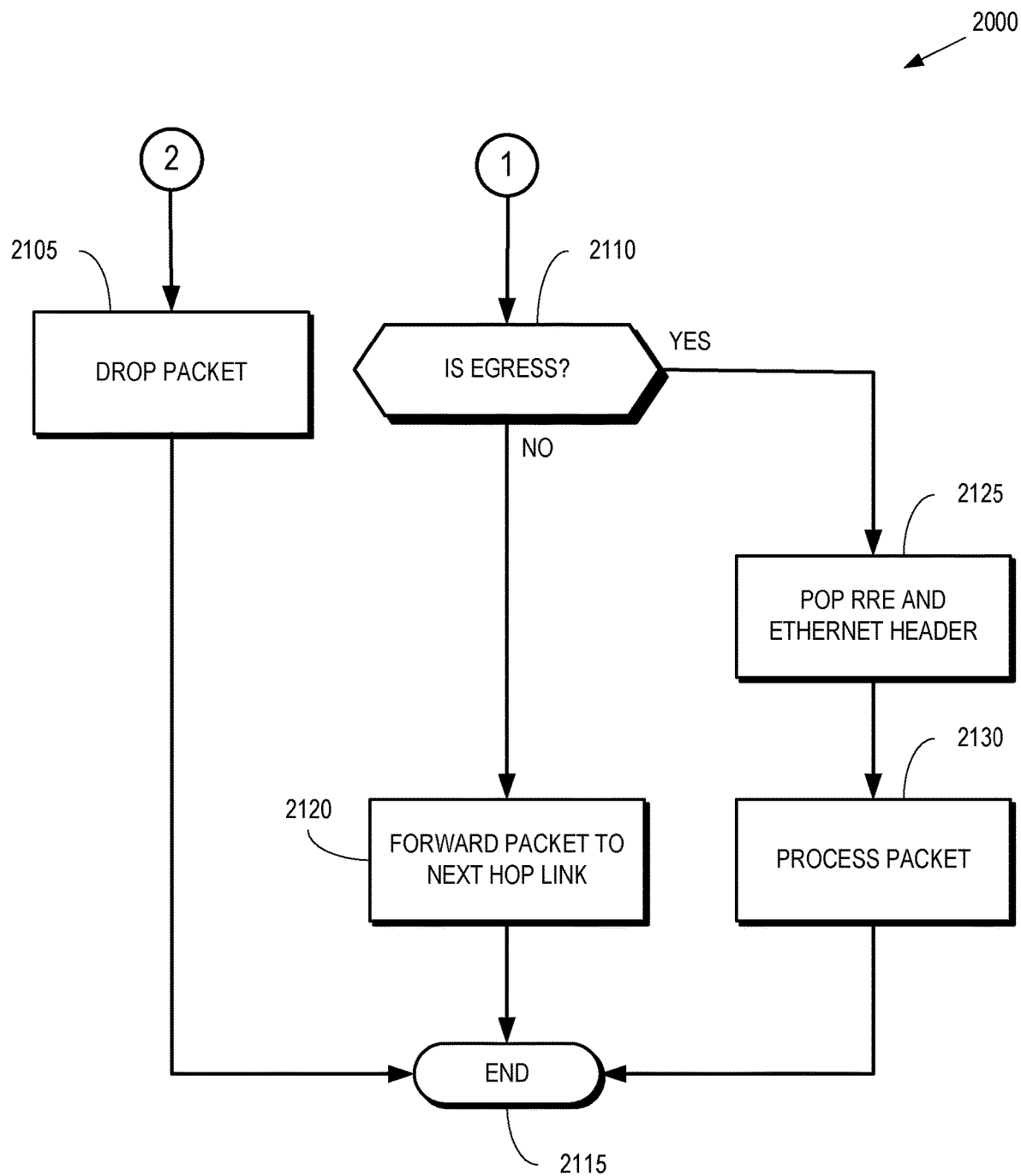
FIG. 21 is a flow diagram of a second portion of the method of processing the ethernet packet at the ethernet bridge according to some embodiments.

FIG. 21 is a flow diagram of a second portion of the method 2000 of processing the ethernet packet at the ethernet bridge according to some embodiments. The node 1 connects the block 2015 shown in FIG. 20 to the block 2110 in FIG. 21. The node 2 connects the block 2030 shown in FIG. 20 to the decision block 2105 in FIG. 21.

At block 2105, the ethernet bridge drops the packet. The method 2000 then flows to block 2115 and the method 2000 ends.

At decision block 2110, the ethernet bridge determines whether the forwarding state indicates that the ethernet bridge is the egress bridge for the ethernet packet. If the ethernet bridge is not the egress bridge, the method 2000 flows to the block 2120. If the ethernet bridge is the egress bridge, the method 2000 flows to the block 2125.

At block 2120, the ethernet bridge forwards the packet to the next top link on the path to the destination. The method 2000 then flows to the block 2115 and the method 2000 ends.

At block 2125, the ethernet bridge pops the RRE (if present) and the incoming ethernet header. At block 2130, the ethernet bridge processes the packet based on the underlying headers. In some embodiments, the ethernet bridge processes the ethernet packet based on underlying headers determined by an Etype at the end of the ethernet related headers. The method 2000 then flows to the block 2115 and the method 2000 ends.

Figure 22:
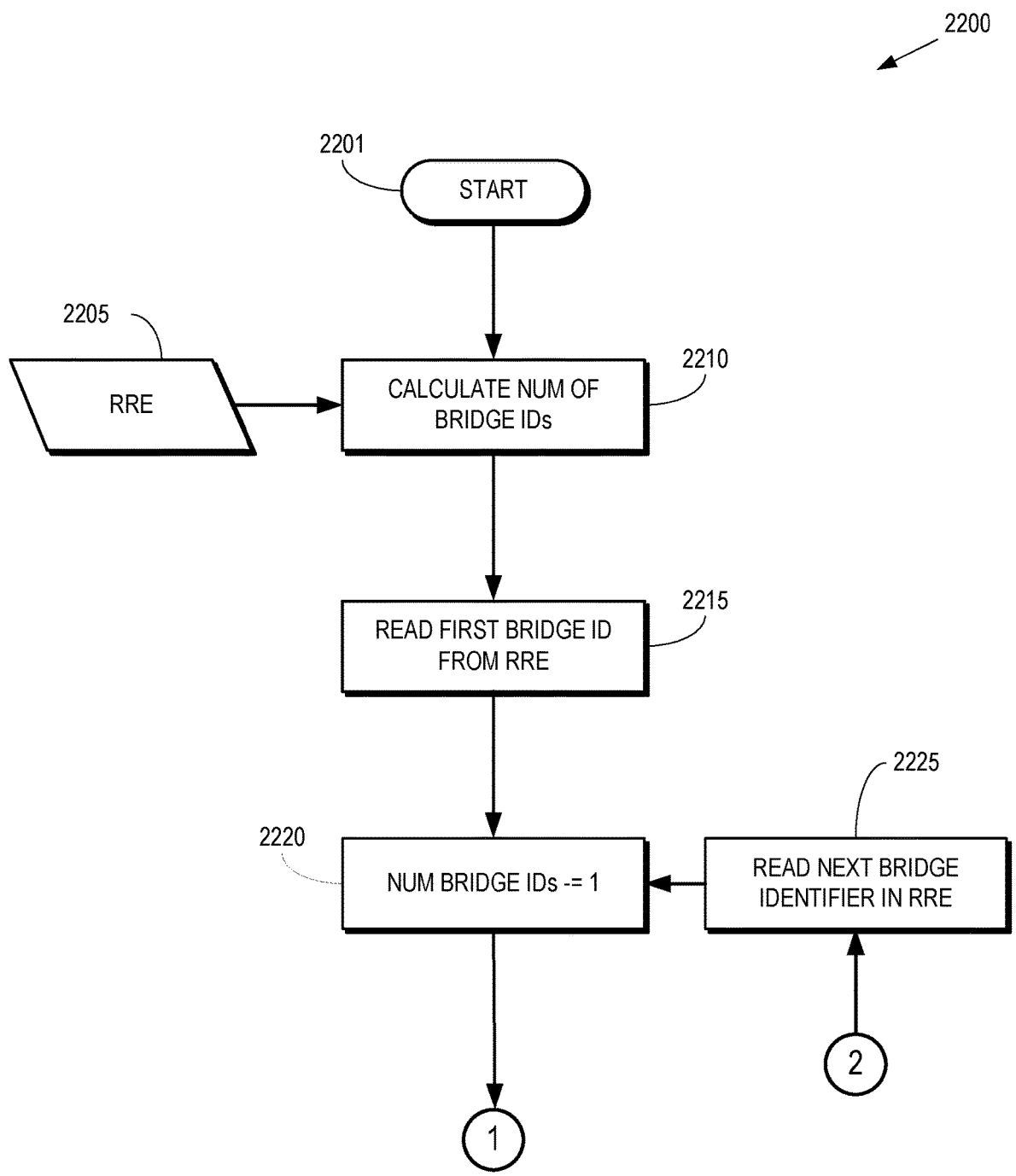
FIG. 22 is a flow diagram of a first portion of a method of performing loop detection at an ethernet bridge according to some embodiments.

FIG. 22 is a flow diagram of a first portion of a method 2200 of performing loop detection at an ethernet bridge according to some embodiments. The method 2200 is implemented by the ethernet bridges in some embodiments of the communication system 1000 shown in FIG. 10, the communication system 1100 shown in FIG. 11, and the communication system 1200 shown in FIG. 12. Some embodiments of the method 2200 are used to implement the block 2220 shown in FIG. 20.

The method 2200 begins at block 2201. At the input block 2205, the ethernet bridge accesses an RRE that was present in an ethernet packet received at the ethernet bridge.

At block 2210, the ethernet bridge computes the total number of bridge identifiers in the RRE and stores in a local variable Num_Bridge_IDs. For example, if the TPID in RRE is 0xB000, the bridge identifier is encoded as a 6-octet MAC address and the number of bridge identifiers is (Value of Length field in RRE/6). If the TPID in RRE is 0xB001, the bridge identifier is encoded as 12-bit Br-VID, and the number of bridge identifiers is (Value of Length field in RRE×8)/16.

At block 2215, the ethernet bridge reads the first bridge identifier from the RRE. At block 2220, the ethernet bridge decrements the value of the number bridge identifiers. In the illustrated embodiment, the ethernet bridge decrements Num_Bridge_IDs by one in response to one entry being read at the block 2215. Thus, the value of Num_Bridge_IDs indicates how many bridge identifiers are left in the RRE that have not yet been compared to the locally configured bridge identifier that uniquely identifies the ethernet bridge. At block 2225, the next bridge identifier in the RRE is read, e.g., in response to determining that the number of bridge identifiers (Num_Bridge_IDs) left to examine is greater than zero at block 2315 in FIG. 23. The method 2200 then flows to the node 1.

Figure 23:
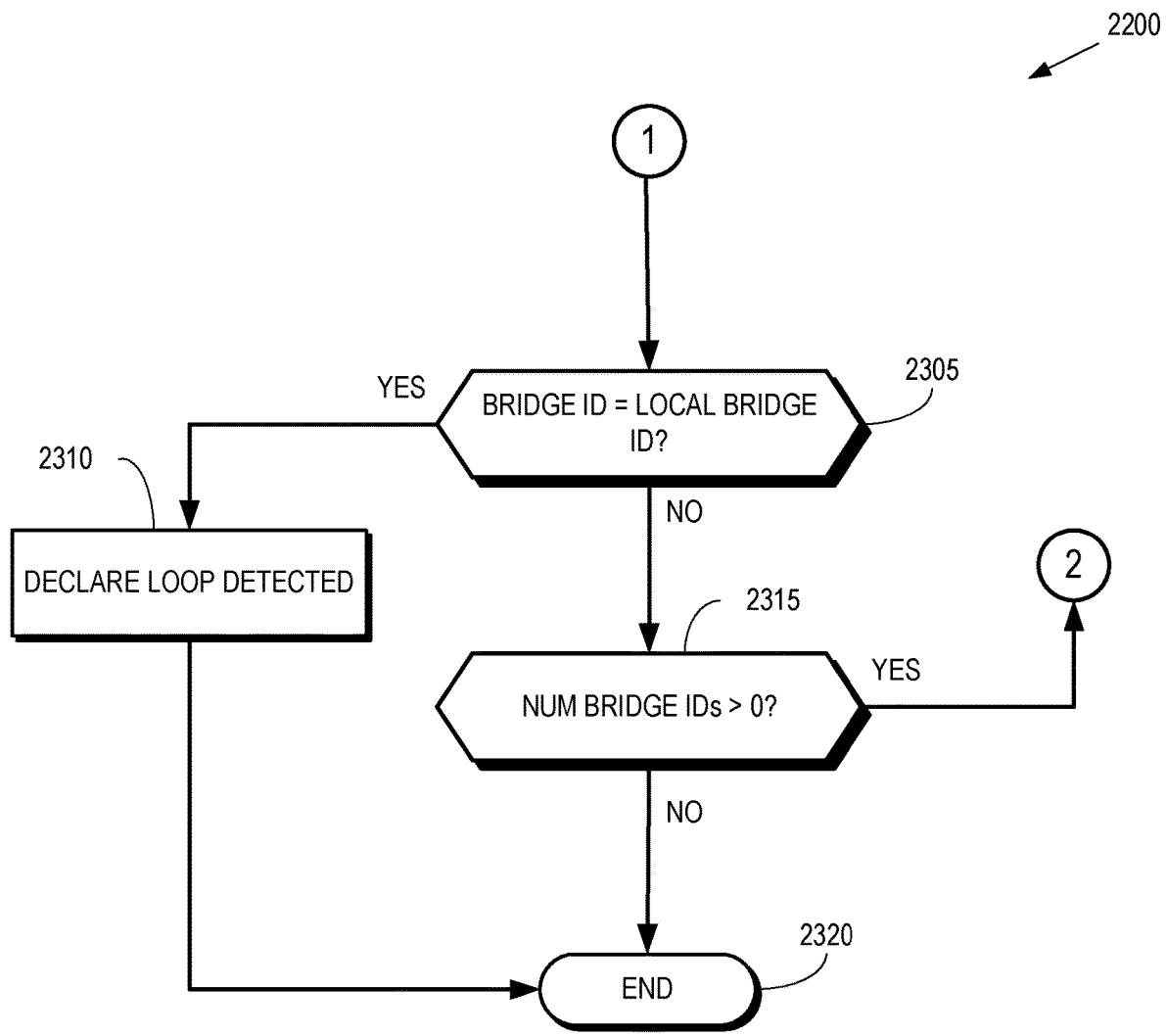
FIG. 23 is a flow diagram of a second portion of the method of performing loop detection at the ethernet bridge according to some embodiments.

FIG. 23 is a flow diagram of a second portion of the method 2200 of performing loop detection at the ethernet bridge according to some embodiments. The node 1 connects the block 2220 shown in FIG. 22 to the decision block 2305 in FIG. 23.

At decision block 2305, the ethernet bridge compares if the bridge identifier is equivalent to the bridge identifier configured locally on the ethernet bridge to identify the ethernet bridge. If the bridge identifier is equivalent to the locally configured bridge identifier, the method is 2200 flows to the block 2310 and the ethernet bridge declares that a loop has been detected. The method 2200 then flows to the block 2320 and the method 2200 ends. If the bridge identifier is not equivalent to the locally configured bridge identifier, the method 2200 flows to the decision block 2315 and the ethernet bridge determines whether there are additional bridge identifiers to examine, e.g., the number of bridge identifiers (Num_Bridge_IDs) is greater than zero. If so, the method 2200 flows to the block 2225 in FIG. 22 via the node 2. If there are no additional bridge identifiers to compare to the locally configured bridge identifier, the method 2200 flows to the block 2320 and the method 2200 ends.

Figure 24:
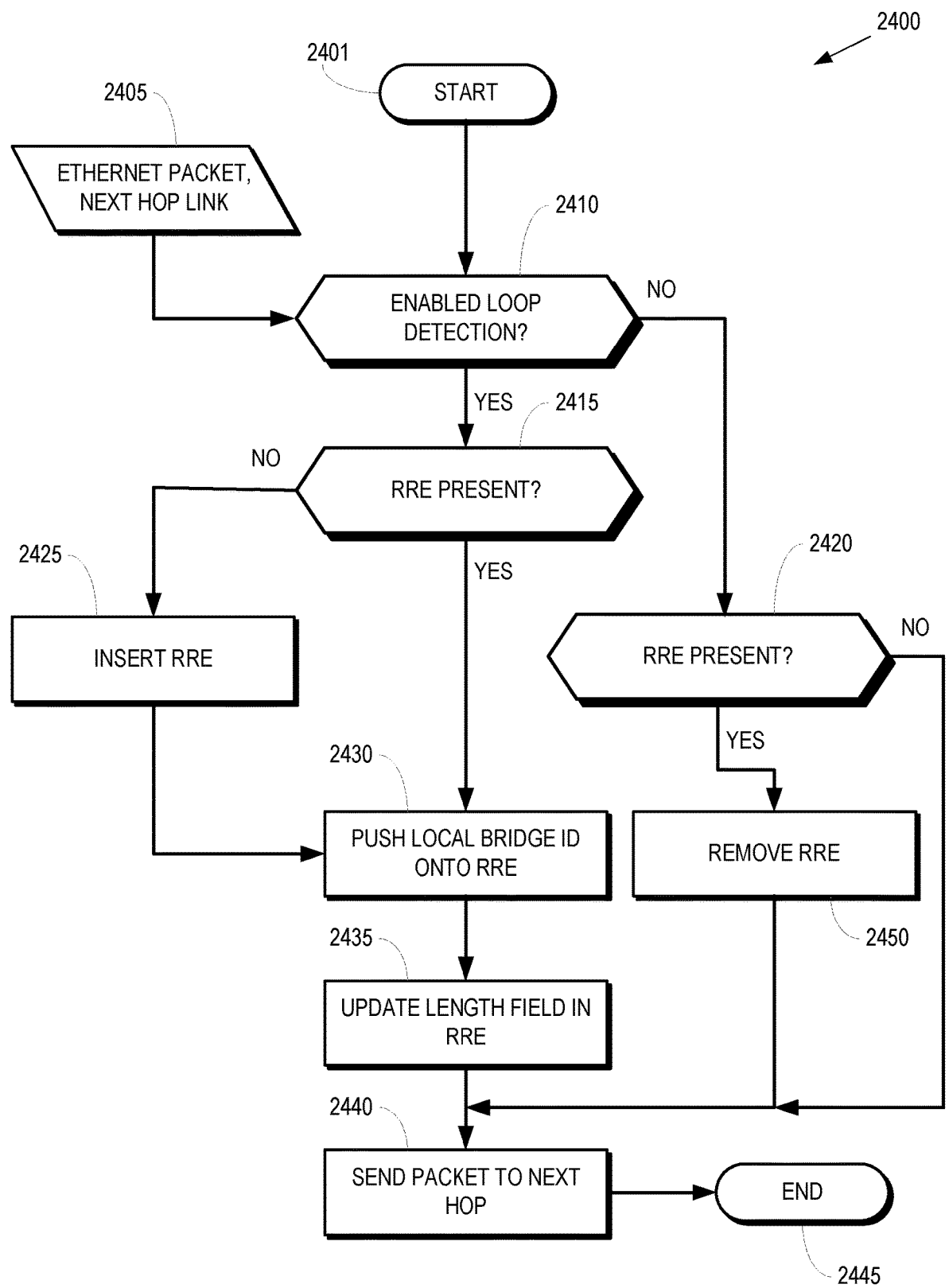
FIG. 24 is a flow diagram of a method of forwarding an ethernet packet to the next hop link according to some embodiments.

FIG. 24 is a flow diagram of a method 2400 of forwarding an ethernet packet to the next hop link according to some embodiments. The method 2400 is implemented by the ethernet bridges in some embodiments of the communication system 1000 shown in FIG. 10, the communication system 1100 shown in FIG. 11, and the communication system 1200 shown in FIG. 12. Some embodiments of the method 2400 are used to implement the block 2120 shown in FIG. 21.

The method 2400 begins at block 2401. At the input block 2405, the ethernet bridge accesses an ethernet packet received at the ethernet bridge and information indicating a next hop link for the packet.

At decision block 2410, the ethernet bridge determines whether loop detection is enabled on the next hop link. If so, the method 2400 flows to the decision block 2415. If loop detection is not enabled on the next hop link, the method 2400 flows to decision block 2420.

At decision block 2415, the ethernet bridge determines whether an RRE is present in the ethernet packet. If not, the method 2400 flows to the block 2425 and the ethernet bridge inserts an empty RRE into the ethernet packet because loop detection is enabled on the next hop link and an RRE was absent from the ethernet packet. The method 2400 then flows to the block 2430. If an RRE is present in the ethernet packet, the method 2400 flows to the block 2430.

At block 2430, the ethernet bridge pushes the local bridge identifier onto the RRE in the ethernet packet. At block 2435, the ethernet bridge increments the value of the length field in the RRE by the size of the bridge identifier that was pushed onto the RRE. The method 2400 then flows to the block 2440.

At decision block 2420, the ethernet bridge determines whether an RRE is present in the ethernet packet. If so, the method 2400 flows to the block 2450 and the ethernet bridge removes the RRE from the packet because loop detection is not enabled on the next hop link. The method 2400 then flows to the block 2440. If there is no RRE present in the ethernet packet, the method 2400 flows to the block 2440.

At block 2440, the ethernet bridge transmits the ethernet packet on the next hop link. The method 2400 then flows to the block 2445 and the method 2400 ends.

Figure 25:
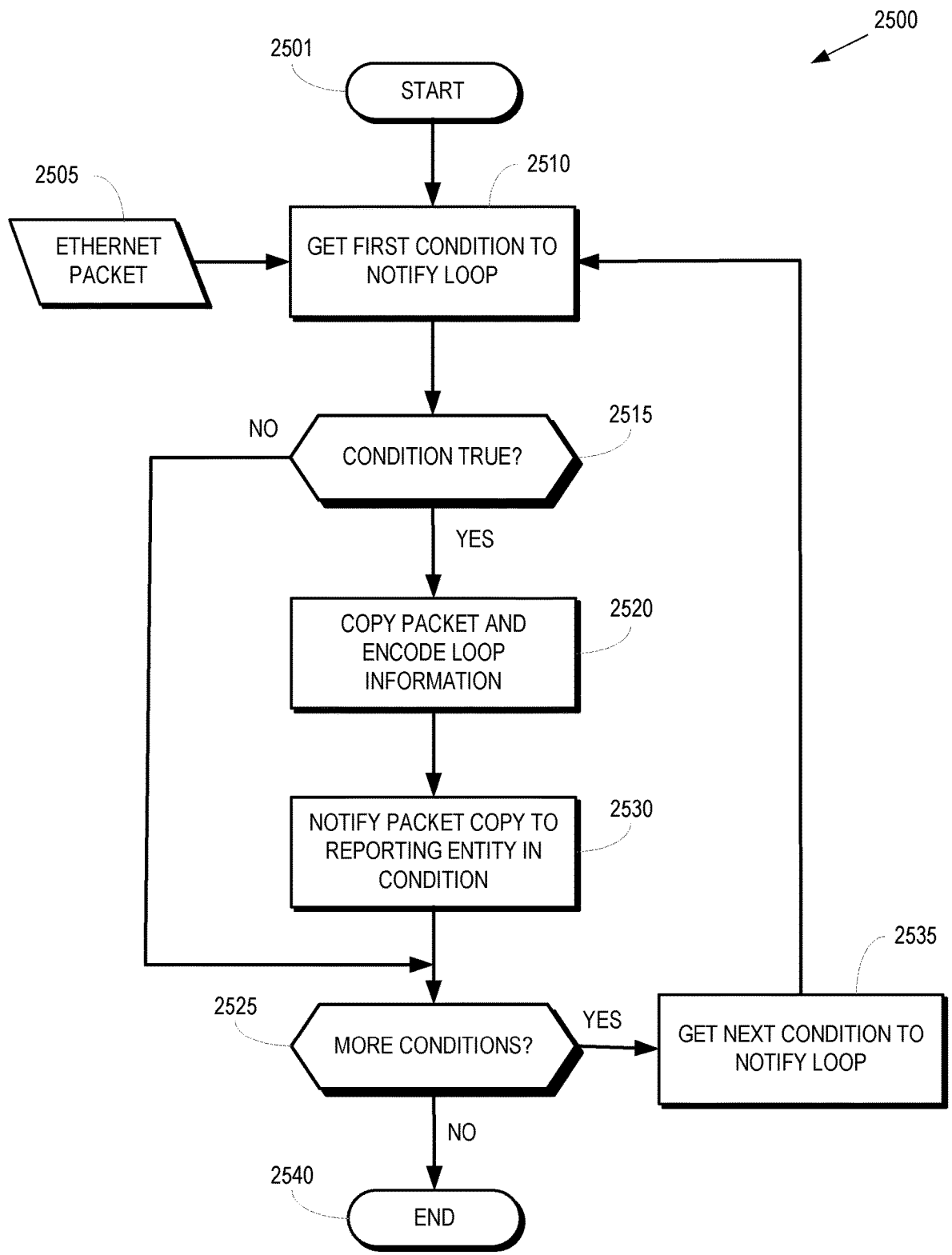
FIG. 25 is a flow diagram of a method of generating and transmitting a loop detection notification according to some embodiments.

FIG. 25 is a flow diagram of a method 2500 of generating and transmitting a loop detection notification according to some embodiments. The method 2500 is implemented by the ethernet bridges in some embodiments of the communication system 1000 shown in FIG. 10, the communication system 1100 shown in FIG. 11, and the communication system 1200 shown in FIG. 12. Some embodiments of the method 2500 are used to implement the block 2030 shown in FIG. 20.

The method 2500 begins at block 2501. At the input block 2505, the ethernet bridge accesses an ethernet packet that included the RRE used to detect a loop.

At block 2510, the ethernet bridge retrieves a first condition for notification of the loop. At decision block 2515, the ethernet bridge determines whether the condition is met (e.g., the condition is true) by the input packet. If so, the method 2500 flows to the block 2520. If not, the method 2500 flows to the decision block 2525.

At block 2520, the ethernet bridge generates a copy of the ethernet packet and encodes the loop information into the packet. Some embodiments of the loop information include a copy of the RRE from the ethernet packet. At block 2530, the ethernet bridge notifies the copy of the ethernet packet to a reporting entity associated with the condition. The method 2500 then flows to the decision block 2525.

At decision block 2525, the ethernet bridge determines whether there are more conditions to check for notification of the loop. If so, the method 2500 flows to the block 2535 and the ethernet bridge retrieves the next condition for notification of the loop. The method 2500 then flows to decision block 2515. If the ethernet bridge determines that there are no more conditions to check for notification of the loop, the method 2500 flows to the block 2540 and the method 2500 ends.

Figure 26:
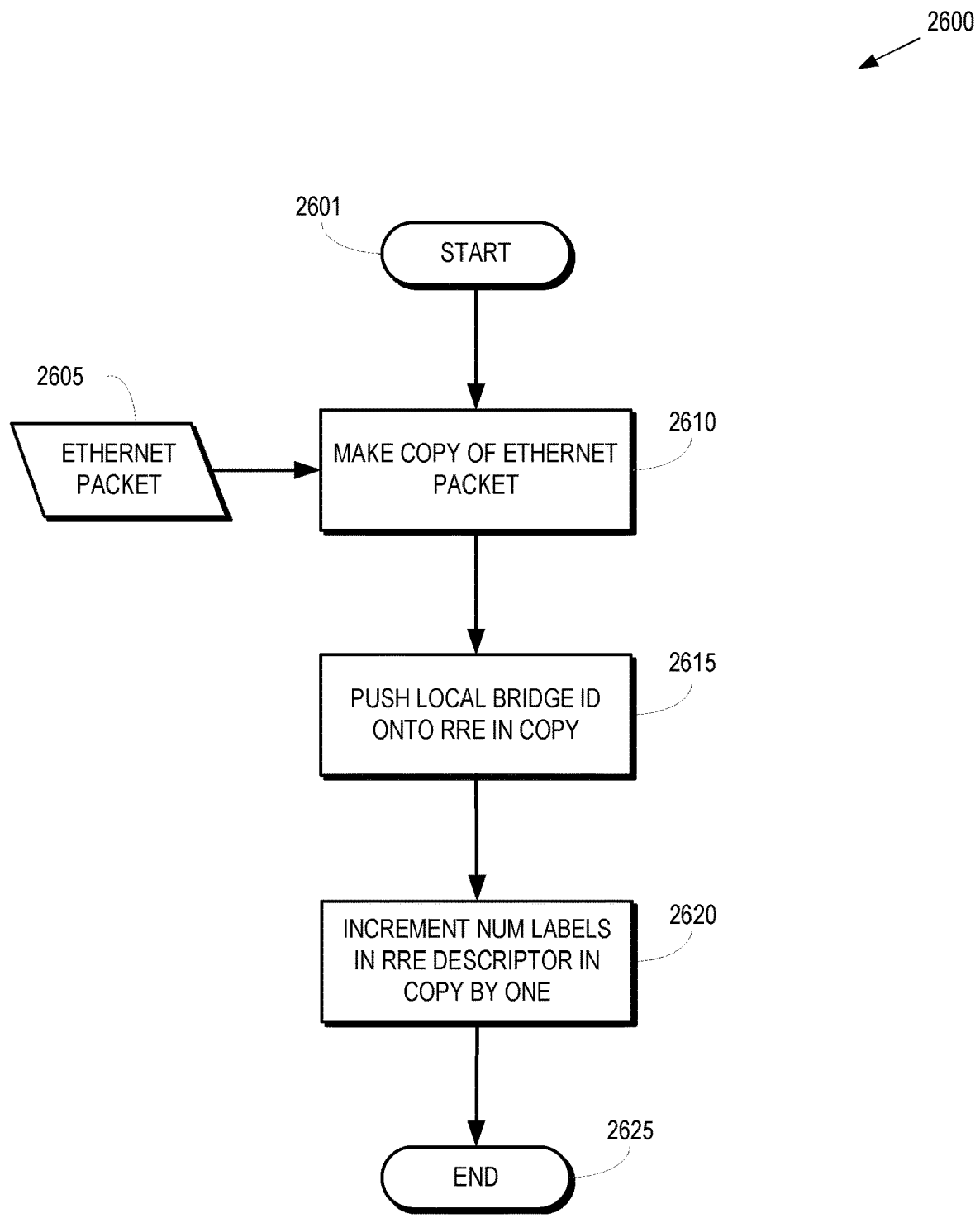
FIG. 26 is a flow diagram of a method of generating a copy of an ethernet packet for loop notification according to some embodiments.

FIG. 26 is a flow diagram of a method 2600 of generating a copy of an ethernet packet for loop notification according to some embodiments. The method 2600 is implemented by the ethernet bridges in some embodiments of the communication system 1000 shown in FIG. 10, the communication system 1100 shown in FIG. 11, and the communication system 1200 shown in FIG. 12. Some embodiments of the method 2600 are used to implement the block 2520 shown in FIG. 25.

The method 2600 begins at block 2601. At the input block 2605, the ethernet bridge accesses an ethernet packet that included the RRE used to detect a loop.

At block 2610, the ethernet bridge makes a copy of the ethernet packet. At the block 2615, the ethernet bridge pushes the local bridge identifier onto the RRE in the copy of the packet. At the block 2620, the ethernet bridge increments the length field in the RRE of the ethernet packet by the size of the local bridge identifier. The method 2600 then flows to the block 2625 and the method 2600 ends.

Figure 27:
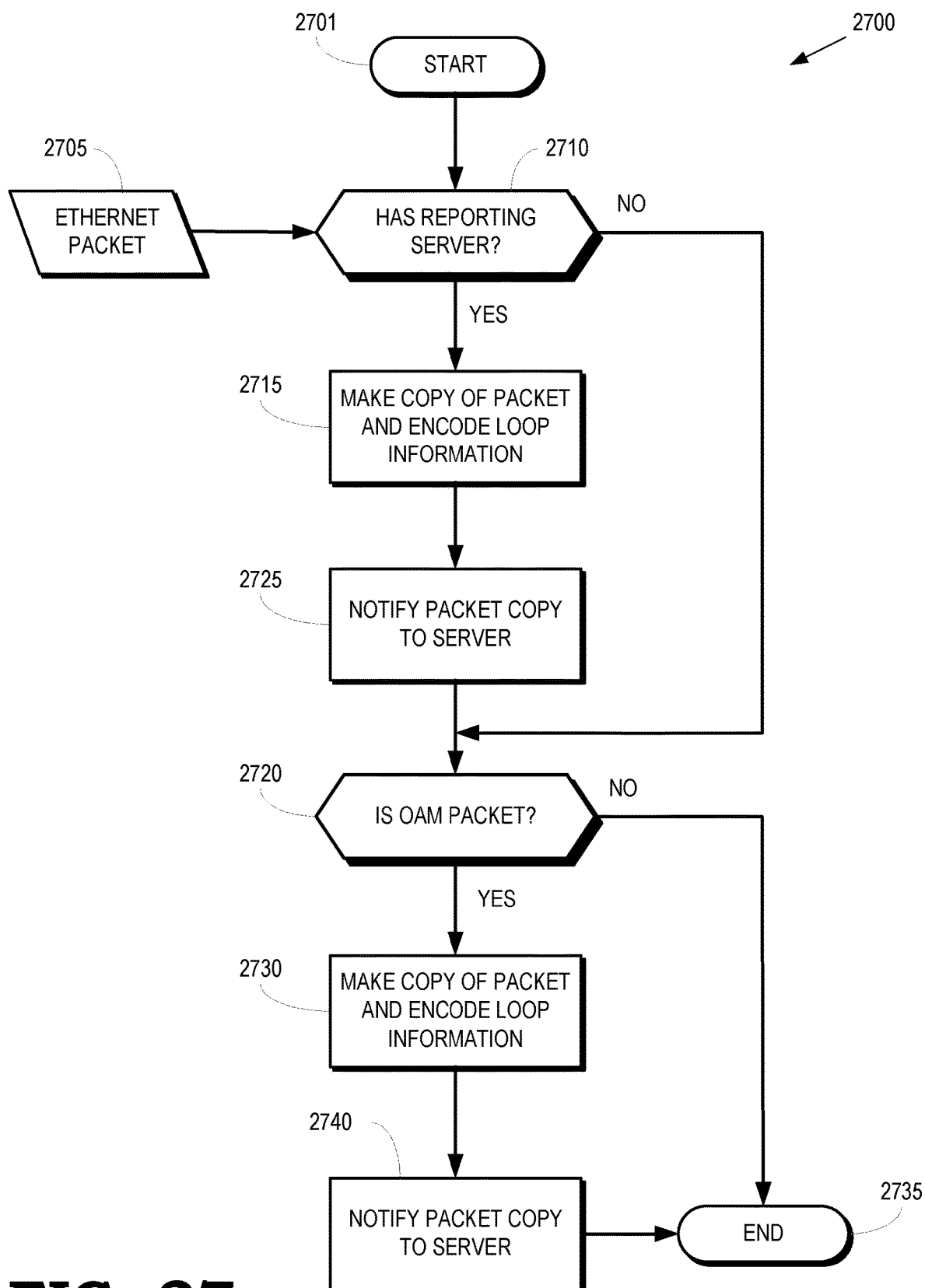
FIG. 27 is a flow diagram of a method of loop notification to a notification server and a sender of an operations, administration, and maintenance (OAM) packet according to some embodiments.

FIG. 27 is a flow diagram of a method 2700 of loop notification to a notification server and a sender of an operations, administration, and maintenance (OAM) packet according to some embodiments. The method 2700 is implemented by the ethernet bridges in some embodiments of the communication system 1000 shown in FIG. 10, the communication system 1100 shown in FIG. 11, and the communication system 1200 shown in FIG. 12. Some embodiments of the method 2700 are used to implement the method 2500 shown in FIG. 25.

The method 2700 implements two conditions for notification of the loop:
   1) the ethernet bridge transmits a notification to a notification server that is configured within the ethernet network (or bridging domain) in response to detecting loops in the network
   2) the ethernet bridge transmits a notification to a sender of a test/OAM ethernet packet if the test/OAM ethernet packet is detected as a looping packet The method 2700 begins at block 2701. At the input block 2705, the ethernet bridge accesses an ethernet packet that included the RRE used to detect a loop.

At decision block 2710, the ethernet bridge determines whether the ethernet bridge is configured to notify loops to a reporting server. If the server is available, the method 2700 flows to the block 2715. If the server is not available, the method 2700 flows to the decision block 2720.

At block 2715, the ethernet bridge makes a copy of the ethernet packet and encodes loop information to the packet, as discussed herein. At block 2725, the ethernet bridge transmits the copy of the packet to the reporting server with a notification indicating "loop detected" on the packet. In some embodiments, the ethernet bridge implements a custom protocol between the bridge and the server to perform the notification. The method 2700 then flows to the decision block 2720.

At decision block 2720, the ethernet bridge determines whether the input ethernet packet is a test packet or an OAM packet. For example, an OAM packet could be a connectivity fault management (CFM) packet. If so, the method 2700 flows to the block 2730. If not, the method 2700 flows to the block 2735 and the method 2700 ends.

At block 2730, the ethernet bridge makes a copy of the packet and encodes the loop information in the packet. At block 2735, the ethernet bridge transmits a reply to the sender of the test or OAM packet. In some embodiments, the reply includes headers from the copy of the packet. The reply is transmitted with a notification indicating "loop detected." In some embodiments, the CFM protocol is modified to support loop notifications generated by the ethernet bridge.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
   a) hardware-only circuit implementations (such as implementations and only analog and/or digital circuitry) and
   b) combinations of hardware circuits and software, such as (as applicable):
      i. a combination of analog and/or digital hardware circuit(s) with software/firmware and
      ii. any portions of a hardware processor(s) with software (including digital signal processor(s), software, and memory(ies) that work together to cause an apparatus, such as a mobile phone or server, to perform various functions) and
   c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An ethernet bridge, the ethernet bridge comprising:
   a memory configured to store a first identifier that uniquely identifies the ethernet bridge within a network;
   a transceiver configured to receive a first data link layer packet; and
   a processor configured to selectively forward the first data link layer packet based on whether a first recorded route for ethernet (RRE) in the first data link layer packet includes the first identifier.

2. The ethernet bridge of claim 1, wherein the first identifier is a virtual local area network (VLAN) identifier or a medium access control (MAC) address of the ethernet bridge.

3. The ethernet bridge of claim 1, wherein the processor is configured to drop the first data link layer packet in response to the first identifier being in the first data link layer packet.

4. The ethernet bridge of claim 3, wherein the processor is configured to generate a loop detection notification including information identifying the ethernet bridge and the first RRE in response to the first identifier being in the first data link layer packet.

5. The ethernet bridge of claim 3, wherein the processor is configured to push the first identifier onto the first RRE in the first data link layer packet in response to the first identifier not being in the first data link layer packet.

6. The ethernet bridge of claim 5, wherein the processor is configured to forward the first data link layer packet including the first RRE having the first identifier in response to the first identifier not being in the first data link layer packet.

7. The ethernet bridge of claim 1, wherein loop detection by the processor is enabled in response to rerouting of a second data link layer packet that encountered a link failure in the network.

8. The ethernet bridge of claim 1, wherein the processor is configured to examine received data link layer packets when loop detection is not enabled and to enable loop detection in response to detecting an RRE in the received data link layer packets.

9. The ethernet bridge of claim 1, wherein the ethernet bridge provides ingress to the network, and wherein the processor is configured to append an RRE including the first identifier to data link layer packets.

10. A method for implementation in an ethernet bridge in a network, the method comprising:
   storing a first identifier that uniquely identifies the ethernet bridge within the network;
   receiving a first data link layer packet; and
   selectively forwarding the first data link layer packet based on whether a first recorded route for ethernet (RRE) in the first data link layer packet includes the first identifier.

11. The method of claim 10, wherein the first identifier is a virtual local area network (VLAN) identifier or a medium access control (MAC) address of the ethernet bridge.

12. The method of claim 10, further comprising:
   dropping the first data link layer packet in response to the first identifier being in the first data link layer packet.

13. The method of claim 12, further comprising:
   generating a loop detection notification including information identifying the ethernet bridge and the first RRE in response to the first identifier being in the first data link layer packet.

14. The method of claim 12, further comprising:
pushing the first identifier onto the first RRE in the first data link layer packet in response to the first identifier not being in the first data link layer packet.

15. The method of claim 14, further comprising:
forwarding the first data link layer packet including the first RRE having the first identifier in response to the first identifier not being in the first data link layer packet.

16. The method of claim 10, further comprising:
enabling loop detection in response to rerouting of a second data link layer packet that encountered a link failure in the network.

17. The method of claim 10, further comprising:
examining received data link layer packets when loop detection is not enabled; and
enabling loop detection in response to detecting an RRE in the received data link layer packets.

18. The method of claim 10, wherein the ethernet bridge provides ingress to the network, and further comprising:
appending an RRE including the first identifier to data link layer packets.

19. An apparatus comprising:
at least one processor; and
at least one memory including computer program code;
the at least one memory and the computer program code configured to, with the at least one processor, cause the apparatus at least to perform:
storing a first identifier that uniquely identifies the apparatus within the network;
receiving a first data link layer packet; and
selectively forwarding the first data link layer packet based on whether a first recorded route for ethernet (RRE) in the first data link layer packet includes the first identifier.

20. The apparatus of claim 19, wherein the at least one memory and the computer program code are configured to, with the at least one processor, cause the apparatus at least to perform:
dropping the first data link layer packet in response to the first identifier being in the first data link layer packet; and
pushing the first identifier onto the first RRE in the first data link layer packet in response to the first identifier not being in the first data link layer packet.

\* \* \* \* \*